US011307885B1

(12) United States Patent
Luciano et al.

(10) Patent No.: US 11,307,885 B1
(45) Date of Patent: Apr. 19, 2022

(54) IDENTIFYING OPTIMIZED COMPUTING RESOURCES FOR RUNNING WORKLOADS

(71) Applicant: Amazon Technologies, Inc., Seattle, WA (US)

(72) Inventors: Lorenzo Luciano, Cambridge, MA (US); Peter William Beardshear, Cambridge, MA (US); Imre Attila Kiss, Arlington, MA (US); Esther Kadosh, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 16/576,450

(22) Filed: Sep. 19, 2019

(51) Int. Cl.
*G06F 9/455* (2018.01)
*G06F 9/50* (2006.01)
*G06F 11/30* (2006.01)

(52) U.S. Cl.
CPC ........ *G06F 9/45558* (2013.01); *G06F 9/5016* (2013.01); *G06F 9/5027* (2013.01); *G06F 9/5077* (2013.01); *G06F 9/5083* (2013.01); *G06F 11/301* (2013.01); *G06F 11/3006* (2013.01); *G06F 2009/4557* (2013.01)

(58) Field of Classification Search
CPC ............. G06F 9/45558; G06F 11/3006; G06F 11/301; G06F 9/5016; G06F 9/5077; G06F 9/5027; G06F 9/5083; G06F 2009/4557
See application file for complete search history.

(56) References Cited

U.S. PATENT DOCUMENTS

| 9,471,237 | B1 | 10/2016 | Dass |
| 10,853,148 | B1* | 12/2020 | Kenney ................. G06F 9/5088 |
| 2006/0253845 | A1 | 11/2006 | Achanta et al. |
| 2014/0215483 | A1 | 7/2014 | Akimoto et al. |
| 2015/0370483 | A1 | 12/2015 | Schoebel-Theuer |
| 2020/0183722 | A1 | 6/2020 | Kumar et al. |
| 2020/0394063 | A1* | 12/2020 | Kelly ..................... G06F 9/452 |

\* cited by examiner

*Primary Examiner* — Sisley N Kim
(74) *Attorney, Agent, or Firm* — Lee & Hayes, P.C.

(57) ABSTRACT

Techniques for a service provider network to generate suitability scores that indicate how well VM instance types are performing given the workloads they are running. Using these suitability scores, users are able to easily determine the suitability of VM instance types for supporting their workloads, and diagnose potential issues with the pairings of VM instance types and workloads, such as over-utilization and under-utilization of VM instances. Further, the techniques include training a model to determine VM instance types recommended for supporting workloads. The model may receive utilization data representing resource-usage characteristics of the workload as input, and be trained to output one or more recommended VM instance types that are optimized or suitable to host the workload. Thus, the service provider network may provide users with easily-digestible suitability scores indicating the suitability of VM instance types for workloads along with VM instance types recommended for their workloads.

22 Claims, 14 Drawing Sheets

600 ⤴

```
┌─────────────────────────────────────────────────────────────┐
│ OBTAIN UTILIZATION DATA INDICATING USAGE OF A COMPUTING     │
│ RESOURCE BY A WORKLOAD RUNNING ON A COMPUTE RESOURCE, THE   │
│ UTILIZATION DATA REPRESENTING A FIRST USAGE CHARACTERISTIC  │
│ AND A SECOND USAGE CHARACTERISTIC                           │
│                            602                              │
└─────────────────────────────────────────────────────────────┘
                              │
                              ▼
┌─────────────────────────────────────────────────────────────┐
│ DETERMINE A FIRST SUITABILITY SCORE FOR THE WORKLOAD        │
│ RUNNING ON THE COMPUTE RESOURCE BASED AT LEAST IN PART ON   │
│ THE FIRST USAGE CHARACTERISTIC                              │
│                            604                              │
└─────────────────────────────────────────────────────────────┘
                              │
                              ▼
┌─────────────────────────────────────────────────────────────┐
│ DETERMINE A SECOND SUITABILITY SCORE FOR THE WORKLOAD       │
│ RUNNING ON THE COMPUTE RESOURCE BASED AT LEAST IN PART ON   │
│ THE SECOND USAGE CHARACTERISTIC                             │
│                            606                              │
└─────────────────────────────────────────────────────────────┘
                              │
                              ▼
┌─────────────────────────────────────────────────────────────┐
│ DETERMINE AN OVERALL SUITABILITY SCORE FOR THE WORKLOAD     │
│ RUNNING ON THE COMPUTE RESOURCE BASED AT LEAST IN PART ON   │
│ THE FIRST SUITABILITY SCORE AND THE SECOND SUITABILITY      │
│ SCORE                                                       │
│                            608                              │
└─────────────────────────────────────────────────────────────┘
```

RECEIVE THIRD UTILIZATION DATA ASSOCIATED WITH USAGE OF REMOTE COMPUTING RESOURCES BY A USER WORKLOAD RUNNING ON A REMOTE COMPUTE RESOURCE, THE REMOTE COMPUTING RESOURCES BEING LOCATED IN A REMOTE RESOURCE NETWORK THAT IS OUTSIDE THE SERVICE PROVIDER NETWORK
712

↓

USE THE MODEL AND THE THIRD UTILIZATION DATA TO DETERMINE AN OPTIMIZED COMPUTE RESOURCE FOR RUNNING THE USER WORKLOAD, THE OPTIMIZED COMPUTE RESOURCE BEING PROVIDED BY THE SERVICE PROVIDER NETWORK
714

↓

PROVIDE A USER ACCOUNT ASSOCIATED WITH THE USER WORKLOAD WITH A RECOMMENDATION TO MIGRATE THE USER WORKLOAD FROM THE REMOTE COMPUTE RESOURCE TO THE OPTIMIZED COMPUTE RESOURCE
716

↓

RECEIVE A REQUEST FROM THE USER ACCOUNT TO MIGRATE THE USER WORKLOAD TO THE OPTIMIZED COMPUTE RESOURCE
718

↓

CAUSE THE USER WORKLOAD TO RUN ON THE OPTIMIZED COMPUTE RESOURCE THAT IS SUPPORTED BY THE COMPUTING RESOURCES OF THE SERVICE PROVIDER NETWORK
720

FIG. 7B

IDENTIFYING OPTIMIZED COMPUTING RESOURCES FOR RUNNING WORKLOADS

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single physical computing device to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

To further increase the utilization of the computing resources, and also to more effectively meet the computing resource needs of users, service provider networks may offer a variety of different types of virtual machines. Specifically, a service provider network may offer a selection of VM instance types that are optimized, or biased, to support different use cases on behalf of users. In such examples, the different VM instance types may be allocated different amounts, and/or different combinations, of the computing resources of underlying physical computing devices to provide users with flexibility to choose a VM instance that is more appropriately optimized to support their computing resource needs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for a service provider network to determine an overall suitability score for a virtual resource running a workload based partly on usage characteristics indicating usage of computing resources by the workload.

FIGS. 7A and 7B collectively illustrate a flow diagram of an example method for a service provider network to collect utilization data for workloads running on virtual resources, filtering the utilization data based on optimized usage characteristics, and training a model to determine recommended VM instance types for workloads.

DETAILED DESCRIPTION

Figure 1:
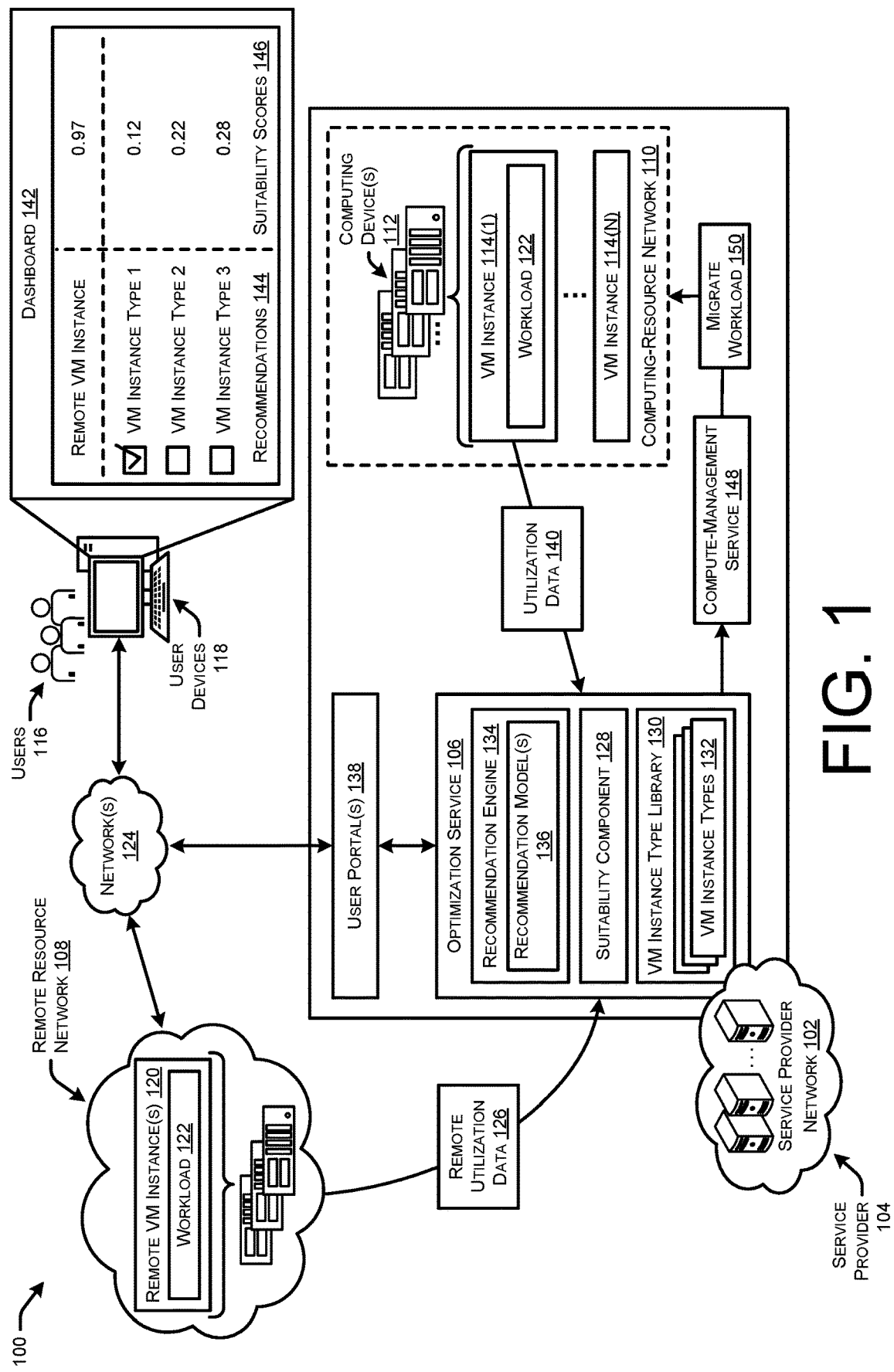
FIG. 1 illustrates a system-architecture diagram of an example environment in which a service provider network determines suitability scores for VM instance types that run workloads, determines optimized VM instance types for running workloads, and recommends the optimized VM instance types to users

Service providers offer various network-based (or "cloud-based") services to users to fulfill computing needs of the users. These service providers may operate service provider networks that include clusters of managed servers (or other hardware-based, computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

As noted above, the service provider networks may utilize virtualization technologies such that the computing devices can each host multiple VM instances that appear and operate as independent computing devices to support workloads of users. Rather than allocating all of the computing resources of a physical computing device to support a single workload for a user, the computing resources of a physical computing device can be allocated amongst multiple VM instances that support different workloads. The service provider network supports many different types of workloads on behalf of users, and these workloads often have different computing resource needs. As described herein, a workload may generally include a designated collection or grouping of computing resources (e.g., compute, memory, storage, networking, etc.) and the code or logic that performs functionality using the computing resources. The service provider network may support a wide variety of workloads, such as web servers, databases, customer-facing applications, distributed data stores, batch processing, machine/deep learning interference, online gaming, video encoding, memory caching, and/or any other type of workload that can be supported by computing resources of a service provider network.

In light of the different workloads that are supported on behalf of users, the service provider network may provide users with a variety of VM instance types optimized to support different workloads. Generally, each VM instance type may be allocated a different amount of computing resources, and/or different combination of computing resources, such that the VM instance types are optimized, or computationally biased, to support different workloads. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing underutilization of computing resources by the service provider network.

Generally, an increase in the amount of VM instance types offered by the service provider network is advantageous and results in a higher likelihood that workloads are supported by a more optimized VM instance. While a large variety of VM instance types is advantageous for various reasons (e.g., efficient utilization of computing resources, high performance for workloads, etc.), it also may become difficult for users, particularly unsophisticated users, to determine how well their VM instance type is performing while supporting their workloads. Stated otherwise, it may be difficult for users to determine if VM instance types that are supporting their workloads are suitable in that they are allocated amounts and/or ratios of computing resources that are suitability tailored to support the workloads.

Accordingly, users may end up having their workloads hosted on VM instance types that are either overutilized (or resource constrained) that result in performance issues, or underutilized and resulting in computing resources that may be unused and sitting idle (or waste). As an example, users may be overly cautious and select an oversized VM instance type to help ensure that their workloads are never resource constrained, which may result in low utilization of computing resources of the service provider network. Additionally, workload utilization characteristics may change overtime due to software changes, additions, etc., resulting in once-suitable VM instance types no longer being suitability tailored to support the workloads of users.

This disclosure describes techniques and technologies implemented by a service provider network to generate suitability scores (or values) that indicate how well VM instance types are performing given specific workloads that they are running. Using these suitability scores, users are able to easily determine the suitability of VM instance types for supporting their workloads, and diagnose potential issues with the pairings of VM instance types and workloads, such as over-utilization and under-utilization of VM instance types. Further, the techniques described herein include training a machine-learning (ML) model to determine recommended VM instance types for workloads based on resource-usage characteristics of the workloads. The ML model may receive utilization data representing resource-usage characteristics of the workload as input, and be trained to output one or more recommended VM instance types that are optimized or suitable to host the workload. In this way, the service provider network may provide users with easily-digestible suitability scores to apprise users of how well suited their VM instance types are for their workloads, and may further provide users with recommended VM instance types that may be better suited for supporting their workloads.

Service provider networks may run the workloads of users on a variety of different VM instance types that are provisioned on computing resources managed by the service provider. These VM instance types may have different ratios of the computing resources allocated for their use (e.g., compute-heavy types, network-heavy types, etc.), and/or different amounts (e.g., small, medium, large, etc.) of computing resources allocated for their use. Similarly, the usage characteristics of workloads may vary based on the type of workload (e.g., database workload, backend-processing workload, etc.). Accordingly, different VM instance types may be more suitable, or appropriately tailored, to run different workloads. It can be difficult for users to determine whether a VM instance type is optimized for their workload. Accordingly, the techniques described herein include determining overall suitability scores for VM instance types running workloads.

The service provider network may initially collect utilization data that indicates usage of computing resource by a workload running on a particular type of VM instance. The utilization data may indicate usage characteristics across one or more resource types (e.g., CPU, memory, disk, networking, GPU, etc.). Additionally, the usage characteristics may indicate multiple metrics of usage for an individual resource type (e.g., average usage rate of CPU, range of usage rates of CPU, etc.). A user that desires to understand how suitable the VM instance type is for their workload may provide the service provider network with access to the utilization data for their workload.

To determine if a VM instance type is suitable for a workload running thereon, the service provider network may define optimized usage characteristics for each VM instance type. The service provider network may analyze utilization data for various VM instance types running workloads on the computing resources of the service provider network to determine the optimized usage characteristics. For example, the service provider network may analyze utilization data for a plurality of VM instance types and determine optimized metrics or optimized usage characteristics for each VM instance type (e.g., optimal average memory utilization, optimal range of usage for memory, etc.). The optimized usage characteristics may be based on performance of the VM instance types, such as optimize usage ranges defined based on lack of throttling, lack of VM instance failures, lack of unhealthy status reports, positive (or lack of negative) user feedback, and/or other indications of optimized usage characteristics. The optimized usage characteristics may generally represent best usage practices for each VM instance type. In this way, each VM instance type may be associated with, or mapped to, optimized usage characteristics across one or more dimensions of compute, and/or across one or more metrics for each dimension of compute.

To determine if a user's workload is running on a suitable/optimized VM instance type, the service provider network may determine usage characteristics for the user's workload on the VM instance type, and compare those to the optimized usage characteristics for that VM instance type. The service provider network may determine suitability scores for one or more resource types and/or one or more metrics for each resource type. For instance, the service provider network may determine a suitability score for the CPU usage characteristics, memory usage characteristics, etc., of the workload based on a measure of deviation from the corresponding optimized usage characteristics. The further the actual usage characteristics deviate from the optimized usage characteristics, the lower the resulting suitability score is for that VM instance type running the workload.

The service provider network may compute a resource-specific suitability score for each resource type for which there is utilization data available. For instance, there may be a CPU suitability score, a memory suitability score, a disk suitability score, etc. The suitability scores for each resource type may be based on a single metric (e.g., average utilization rate), or multiple metrics where multiple scores are aggregated for a single suitability score for the resource type. Upon determining suitability scores for each resource type based on a deviation of the usage characteristics from the optimized usage characteristics, the service provider network may aggregate the suitability scores for an overall suitability score. The overall suitability scores indicate an overall suitability of the VM instance type to run the workload for each resource type. In some instances, the suitability scores for each resource type may be weighted equally when aggregating, and in other examples some suitability scores may be weighted more heavily. For instance, a user may provide user input indicating that they are less concerned about suitability across a particular dimension (weight less heavily), but more concerned about suitability across a difference dimension (weight more heavily), based on the workload.

In this way, the service provider network may determine how suitable, or how optimized, a VM instance type is for running the workload. In some instance, the service provider network may normalize the overall suitability score and provide it to the user for ease in consumption. For instance, a score that is closer to the number "1" may indicate that resources of the VM instance type are being over-utilized, a score that is closer to the number "−1" may indicate that the resources of the VM instance type are being under-utilized, and a score closer to "0" may indicate that the VM instance type is appropriately sized and optimized for the workload.

The suitability score may be useful in a variety of scenarios. For instance, users that mange workloads using their own resources, or through remote resource network other than the service provider network, may determine performance of the VM instance types being used to run their workloads. The users may provide utilization data to the service provider network for determination of the suitability score and determine that their VM instance types are severely over-utilized, resulting in performance issues, or severely under-utilized, resulting in wasted resources. The user may then determine to change VM instance types, such as by migrating their workloads to be run on VM instances of the service provider network.

In some examples, the service provider network may further provide the users with recommendation as to which VM instance types are optimized to run their workloads. To do so, the service provider network may train models or classifiers, such as neural networks, to determine optimized VM instance types for workloads based on utilization data. To train the model, the service provider may collect utilization data for the VM instance types running workloads on the computing resources of the service provider network (with permissions of users if their workloads are running). The service provider network may generate overall suitability scores for each VM instance type based on their respective utilization data, and filter out VM instance types that have suitability scores that are outside a threshold deviation from an optimized range of suitability scores. In this way, the utilization data may be filtered into a subset of utilization data that represent VM instance types running workloads at optimized usage rates (e.g., "ground truth" utilization data). The optimized utilization data may then be input into the model as training data to train, for example, one or more layers of a neural network to identify optimized utilization data for VM instance types.

After training the model, the service provider network may receive a user's utilization data for their VM instance type running their workload, and input that utilization data into the model. The model may determine, based on the usage characteristics of the workload running on the VM instance type, one or more optimized VM instance types that are allocated computing resource amounts/ratios which are suitable to support the usage characteristics of the user's workload. The VM instance types may be provided in a ranked list where the VM instance types are ranked based on a confidence that the model has for each VM instance type be suitable for running the workload. The recommended VM instance types may be provided to the user to view and potentially select from to run their workload.

In examples where the user decides to migrate their workload to be run on one of the recommended VM instance types, the service provider network may monitor the performance of the VM instance type moving forward to ensure the recommendations made by the model were appropriate. To do so, the service provider network may collect utilization data indicating usage of the computing resources by the workload running on the VM instance type. Using the techniques described above, the service provider network may determine an overall suitability score for the VM instance type running the workload and use the overall suitability score to determine if the VM instance type is optimized for the workload (e.g., determine whether overall suitability score is within a threshold deviation from "0").

Although the techniques described herein are described primarily with respect to VM instance types for workloads, the techniques are equally applicable for any number of VM instances and/or workloads. For example, a workload may be supported by a VM instance, by multiple VM instances, and/or by a fleet of VM instances. In some examples, one or more workloads may be supported by a fleet of VM instances that are scalable to support increases and decreases in use, and may be placed behind one or more load balancing devices of the service provider network. In such examples, the techniques described herein may be applicable to all VM instances in a fleet that support various instances of the same workload. Similar techniques can be applied to other resource offerings having a number of different types, for example storage resources, database resources, networking resources, and the like.

To provide users more control over their workloads and VM instance types, the optimization service may simply provide recommendations via user accounts that the users should consider VM instance types to optimize performance of their workload. However, in some examples the optimization service may be configured to automate the migration of workloads to new VM instance types. For example, the users may select an option, or "opt in," to give the optimization service permission to automate the migration of workloads to new VM instance types. Similarly, the service provider network may request users' permission to obtain utilization data for the VM instances running their workloads prior to collecting and analyzing the utilization data. Further, rather than using utilization data for users' workloads, the service provider network may simply simulate workloads on different VM instance types to collect the utilization data.

This application describes techniques that increase the overall utilization of computing resources provided by servers or other hardware devices, such as CPU, GPU, memory, disk, and/or network availability. The optimization service may determine VM instance types that are more appropriately tailored, or allocated a more appropriate amount of computing resources, to support for workloads. In this way, the techniques described herein help prevent underutilization of computing resources of a service provider network, which reduces the amount of computing resources that are (i) allocated or reserved for VM instances, but (ii) sit idle or unused because the VM instances are oversized for the workload they support. Additionally, the techniques improve the performance of workloads by intelligently placing workloads on VM instance types that are computationally biases or optimized to support the workloads. The optimization service may place the workloads on VM instances to help ensure that the workloads have sufficient amounts of computing resources available, of the types of computing resources needed, to help avoid over constrained VM instance types and workloads.

While the techniques described herein are primarily with reference to VM instances, the techniques are equally applicable to any type of computing resource. For instance, the techniques are equally applicable for containers, hardware devices, virtual processes and functions, and so forth. As an example, rather than considering the computing resource usage of resources provided by a VM instance to a workload, the techniques may be applied to a hardware device with reference to the hardware specifications of that device itself (with or without a virtualization layer). Similarly, the techniques are equally applicable to any virtual resource that may be allocated, or otherwise use, computing resources. In one examples, rather than analyzing utilization data for a VM instance on which the workload is running, the techniques may simply be applied for a computing device that does not have a virtual layer, such as a VM instance. For example, the utilization data may simply indicate usage of the resources provide to the workload by the underlying computing device, and the suitability score may indicate how well suited the particular computing device is for the workload. Further, the recommendations provided for running the workload may be recommendations for other types/versions/models of computing devices to run the workload. Thus, the techniques described herein are equally applicable to virtual resources (e.g., VM instances, containers, etc.), computing devices (e.g., servers, various types of computing devices, sizes of computing devices, etc.), and/or a combination thereof.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 determines suitability scores for VM instance types that run workloads, determines optimized VM instance types for running workloads, and recommends the optimized VM instance types to users As illustrated, a service provider network 102 may be operated and/or managed by a service provider 104. Service provider network 102 may be a cloud provider network (sometimes referred to simply as a "cloud") which refers to a large pool of network-accessible computing resources (such as compute, storage, and networking resources, applications, and services), which may be virtualized or baremetal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The service provider network 102 can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The service provider network 102 may offer virtual compute instances with varying computational and/or memory resources. In one embodiment, each of the virtual compute instances may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The service provider network 102 may provide various other resources and services to users 116 to fulfil their computing resource needs, such as cloud-based computing resources. For example, the service provider network 102 may provide cloud-based, scalable, and network accessible compute power services, storage services, database services, and/or other services. Users 116 may utilize user devices 118 to subscribe for use of the computing resources and/or services provided by the service provider network 102. The service provider network 102 may include an optimization service 106 that is configured to select VM instance types to support workloads of the users 116 which optimize performance of the workloads, and refrain from underutilization or overutilization of the computing resources that support the VM instances and workloads.

The service provider network 102 may span across different geographic regions, and include or be associated with a computing resource network 110 that includes clusters of managed computing devices 112 (e.g., servers) stored in data centers located across the different geographic regions. In this way, users 116 who have subscribed for use of the network-based services supported by computing resources in the data centers need not invest in and maintain the computing infrastructure required to implement the various services that they may need. In some examples, users 116 of the service provider network 102 may access or utilize computing resources of the computing devices 112 in the data centers located in different geographic regions such that users 116 located in these different geographic regions are provided with access these resources and services.

Generally, the computing devices 112 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 112 may be various types of computing devices, such as devices that have different chip set generations, are from different vendors, have different hardware architectures, and so forth.

Thus, the computing resources of the computing-resource network 110 provided by the computing devices 112 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 112 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

As illustrated, the computing devices 112 may each support VM instances that may be different types of VM instances provided by the service provider network 102. For instance, computing devices 112 may support one or more VM instances 114(1)-114(N) that are of a one or more VM instance types. Rather than allocating all the computing resources of an entire computing device 112 to support a workload for the user 116, the service provider network 102 may utilize a virtualization layer (e.g., containing one or more hypervisors) that includes instances of "virtual" computing resources (also referred to interchangeably herein as "virtual machines" or "VM instances") that represent the allocated portions of the physical computing resources of the computing devices 112. These VM instances 114 may emulate computing devices 112 to operate and support workloads, and may have their own operating systems, processing capabilities, storage capacity, and network connections or interfaces. As described herein, different VM instance types may be allocated different types of computing resources, different ratios of computing resource types, different amounts of computing resources types, and/or any combination thereof.

In some examples, the users 116 may utilize a remote resource network 108 to support remote VM instances 120 that run one or more workloads 122 on behalf of the users 116. The remote resource network 108 may be managed by an entity other than the service provider 104 and be outside/remote from the service provider network 104. In some examples, the remote resource network 108 may include on-premise computing resources managed by the user 116 themselves to run the workloads 122, and in other examples the remote resource network 108 may be managed by another entity, such as a difference service provider.

Users 116 may desire to determine whether the remote VM instance 120 is optimal for running their workload 112. In some instances, the users 116 may create user accounts with the service provider 104 to utilize the resources and services of the service provider network 102. The users 116 may utilize their user devices 118 to communicate over one or more networks 124 (e.g., WANs, PANs, LANs, etc.) with the service provider network 102. The user devices 116 may comprise any type of computing device configured to communicate over network(s) 124, such as mobile phones, tablets, laptop computers, desktop computers, televisions, servers, and/or any other type of computing device. The users 116 desire to determine if their remote VM instances 120 are optimized for the workloads 122, and also determine if the service provider network 102 provides VM instance types that are more suitability or optimized to run their workloads 122.

Accordingly, the users 116 may, via their user account, request that the service provider network 102 analyze remote usage data 126 indicating usage of computing resources in the remote resource network 108 by the workload 122 running on the remote VM instances 120. In some examples, the remote utilization data 126 may be provided from the remote resource network 108 to the service provider network 102, such as via one or more user portals 138 (e.g., web console, command line interface (CLI), application programming interface (API), etc.). The user portals 138 may provide the remote utilization data 126 to the optimization service 106 which includes a recommendation engine 134 that includes one or more recommendation models 136, a suitability component 128, and a VM instance type library 130 storing indications of different VM instance types 132(1)-132(N) offered by the service provider network 102.

The user 116 may provide the remote utilization data 126 that generally indicates one or more resource-usage characteristics of the workload 122 on the remote VM instances 120. As described herein, utilization data may indicate usage of resources by the workload 122 over a period of time, and may indicate various usage characteristics such as average utilization for each resource type, ranges of rates of utilization for each resource type, and so forth.

The suitability component 128 may be configured to analyze the remote utilization data 126 and determine an overall suitability score for the remote VM instance 120 to run the workload 122. In some examples, the suitability component 128 may determine the overall suitability score based on suitability scores determined for multiple resource types provided to the workload 122 by the remote VM instance 120. For instance, the suitability component 128 may determine a suitability score for the CPU usage characteristics, memory usage characteristics, etc., of the workload 122 based on a measure of deviation from the corresponding optimized usage characteristics. The further the actual usage characteristics deviate from the optimized usage characteristics, the lower the resulting suitability score is for that remote VM instance 120 that runs the workload 122.

The suitability component 128 may compute a resource-specific suitability score for each resource type for which there is remote utilization data 126 available. For instance, there may be a CPU suitability score, a memory suitability score, a disk suitability score, etc. The suitability scores for each resource type may be based on a single metric (e.g., average utilization rate), or multiple metrics where multiple scores are aggregated for a single suitability score for the resource type. Upon determining suitability scores for each resource type based on a deviation of the usage characteristics from the optimized usage characteristics, the suitability component 128 may aggregate the suitability scores for an overall suitability score. The overall suitability scores indicate an overall suitability of the remote VM instance 120 to run the workload 122 for each resource type. In some instances, the suitability scores for each resource type may be weighted equally when aggregating, and in other examples some suitability scores may be weighted more heavily. For instance, the user 116 may provide user input indicating that they are less concerned about suitability across a particular dimension (weight less heavily), but more concerned about suitability across a difference dimension (weight more heavily), based on the workload 122.

In this way, the suitability component 128 may determine how suitable, or how optimized, the remote VM instance 120 is for running the workload 122. In some instance, the suitability component 128 may normalize the overall suitability score and provide it to the user 116 for ease in consumption. For instance, a score that is closer to the number "1" may indicate that resources of the remote VM instance 120 are being over-utilized, a score that is closer to the number "−1" may indicate that the resources of the remote VM instance 120 are being under-utilized, and a score closer to "0" may indicate that the remote VM instance 120 is appropriately sized and optimized for the workload 122.

The service provider network 102 may further include the recommendation engine 134 that includes one or more recommendation models 136 that are used to determine optimized VM instance types 132 for the workload 122, and provides recommendations to the users 116 for their workloads 122. The recommendation engine 134 may provide recommendations that the user migrate their workload 122 to VM instance types 132 provided by the service provider network 102 that are more suitable or optimized to support the workload 122.

To this end, the service provider 102 may offer a wide variety of VM instance types 132 that differ based on (i) the amounts of physical computing resources allocated for use by the VM instance type 132, and/or (ii) the combinations of the types of physical computing resources allocated for use by the VM instance type 132. In some instances, there may be at least five high-level categories or types of computing resources included in the computing-resource network 110 and provided by the computing devices 112, which are CPU, GPU, memory, storage, and network throughput. The different VM instance types 132 are allocated different amounts and/or combinations of these, and potentially other, computing resources. For example, the VM instance types 132 may be allocated use of larger or smaller amounts of the different resource types to be computationally biased or optimized support workloads 122 with various computing resource utilization characteristics.

For example, the VM instance types 132 can include compute optimized types, memory optimized types, accelerated optimized types, storage optimized types, and/or network throughput optimized types. As a specific example, a VM instance type 132 that is compute optimized may be allocated use of 4 vCPUs of 3.0 GHz processors where each core can run at up to 3.5 GHz, but only be allocated 8 gibibytes (GiBs) of memory. Conversely, a VM instance type 132 that is memory optimized may be allocated 32 GiB of memory, but only run on a 3.1 GHz processor with 2 vCPUs.

In addition to biasing the VM instance types 132 by varying the amounts or ratios of computing resource types allocated for use by the different VM instance types 132, the service provider 104 may further include different sizes of VM instance types 132 for workloads 122 that require more or less computing resources at various ratios. For example, a smaller VM instance type 132 that is computationally biased may be allocated 2 vCPUs of a 3.0 GHz processor and 4 GiB of memory, and an extra-large VM instance type 132 that is computationally biased may be allocated 72 vCPUs on the 3.0 GHz processor and 144 GiB of memory (e.g., 36× the vCPUs and memory allocation of the smaller type).

Accordingly, the service provider 104 may offer a wide selection of VM instance types 132 that are included in a VM instance type library 130 in which a user 116 can search and select a desired VM instance type 132 for their workload 122. Traditionally, the users 116 would have to mentally map out the computing resource needs of their workload 122 and peruse the library 130 offering of VM instance types 132 to locate a VM instance type 132 that seems appropriate for their needs. However, not only is this time consuming, but it may also result in users 116 having their workloads hosted on VM instance types 132 that are either overutilized and resource constrained, or underutilized and resulting in computing resources that may be unused and sitting idle.

The recommendation engine 134 may be utilized to provide the users 116 with recommendation as to which VM instance types 132 are optimized to run their workloads 122. To do so, the recommendation engine 134 may train recommendation models 136 or classifiers, such as neural networks, to determine optimized VM instance types 132 for workloads 122 based on utilization data 126. To train the model 136, the recommendation engine 134 may collect utilization data 140 from VM instances 114 that are running workloads 122 in the computing-resource network 110 of the service provider network 102 (with permissions of users 116 if their workloads 122 are running). The recommendation engine 134 may generate overall suitability scores for each VM instance type 132 based on their respective utilization data 140, and filter out VM instance types 132 that have suitability scores that are outside a threshold deviation from an optimized range of suitability scores. In this way, the utilization data 140 may be filtered into a subset of utilization data that represent VM instance types 132 running workloads at optimized usage rates (e.g., "ground truth" utilization data). The optimized utilization data 140 may then be input into the model 136 as training data to train, for example, one or more layers of a neural network to identify optimized utilization data for VM instance types 132.

In some examples, the remote utilization data 126 and/or utilization data 140 may further include other machine characteristics, such as the operating system running on the VM instances 114/120, specifications of the machine (e.g., model, version, etc.), what processes are running, network connections, etc. This configuration data may be analyzed and utilized similar to how the remote utilization data 126 and utilization data 140 are analyzed and utilized as described herein.

After training the recommendation model 136, the recommendation engine 134 may receive input the remote utilization data 126 into the recommendation model 136. The model 136 may determine, based on the usage characteristics of the workload 122 running on the remote VM instance 120, one or more optimized VM instance types 132 that are allocated computing resource amounts/ratios which are suitable to support the usage characteristics of the user's 116 workload 122. The VM instance types 132 may be provided in a ranked list where the VM instance types 132 are ranked based on a confidence that the model has for each VM instance type be suitable for running the workload 122. The recommended VM instance types 132 may be provided to the user 116 to view and potentially select from to run their workload 122.

As illustrated, the user 116 may utilized their user device 118 to view various data provided to the user 116 via their account (e.g., user portal(s) 138). The user 116 may view a dashboard 142 that includes recommendations 114, such as a listing of VM instance types 132 that are recommended for the workload 122. Additionally, the dashboard 142 may present the remote VM instance, and suitability scores 146 for the recommended VM instance types 132 as well as a suitability score 136 for the remote VM instance 120. In this way, the user 116 can determine how suitable the remote VM instance 120 is for running the workload 122, and how suitable the VM instance types 132 are for running the workload 122.

As illustrated, the suitability scores 146 may comprise values that indicate a suitability of the recommended VM instance types 144 according to a scale. The scale may generally comprise any scale or range of numbers usable to represent the suitability of different VM instance types 132. In some examples, the scale may be positive numbers (e.g., scale from 0 to 1, scale from 0 to 10, etc.), and in some instances the scale may be negative numbers (e.g., scale from 0 to −1, scale from 0 to −100, etc.), and in some instances the scale may be a combination of negative and positive numbers (e.g., scale from −1 to 1, scale from −10 to 10, etc.). While certain example values are shown in the figures for illustrative purposes, it should be understood that the any values (negative, positive, any decimal, etc.), normalized/modified according to any scale, may be used to represent the suitability scores 146. Additionally, the suitability scores 146 may be other characters or symbols (e.g., 1-5 starts, thumbs up/down, etc.).

Thus, the VM instance recommendations 144 may be presented in a dashboard 142 accessible via the user portal(s) 138, and the user 116 may select the VM instance type 132 on which they would like to launch their workload 122. The optimization service 106 may receive input data indicating a selection of the a recommended VM instance type 132, and provide a compute-management service 148 an instruction to launch the workload 122 on one or more (e.g., a fleet) of VM instances 114 that correspond to the VM instance type 132 that the user 116 selected. In some examples, the workload 122 may include code provided by the user 116, and/or generated by the service provider network 102, to implement functionality of the desired workload 122. For example, the service provider network 102 may provide services that generate code for the workload 122, including an application stack and/or other programs, to implement the workload 122. The workload 122 may be supported by one VM instance 114, and/or a fleet of VM instances 114. In some examples, one or multiple VM instances 114 in a fleet of VM instances 114 may support respective workloads 122 on behalf of the user account of the user 116. The compute-management service 148 may further deploy one or more load balancers in front of the fleet of VM instances 114 to scale the workload(s) 122, and other configurations or devices (e.g., security groups) to support the workload. In this way, the optimization service 106 may help a user 116 select, configure, and utilize a VM instance type 132 that is optimized to support a new workload 122 for the user 116.

In examples where the user decides to migrate 150 their workload to be run on one of the recommended VM instance types 132, the service provider network 102 may monitor the performance of the VM instance type 132 moving forward to ensure the recommendations made by the model 136 were appropriate. To do so, the suitability component 128 may collect utilization data 140 indicating usage of the computing resources by the workload running on the VM instance type 132. The suitability component 128 may determine an overall suitability score for the VM instance type 132 running the workload 122 and use the overall suitability score to determine if the VM instance type 132 is optimized for the workload 122 (e.g., determine whether overall suitability score is within threshold deviation from "0").

In some examples, the optimization service 106 may further monitor the workload 122 for the life of the workload 122, determine updated suitability scores 146, and provide additional recommendations 144 upon detecting events that result in a different VM instance type 132 being more optimized to support the workload than the current VM instance type 132 to which the VM instance 114 corresponds. For instance, the user 116 may provide an indication to the optimization service 106 that the workload 122 has undergone a configuration change (e.g., update, software change, traffic change, etc.) that will likely result in a change in the resource-utilization characteristics of the workload 122. In other examples, the optimization service 106 may periodically, or continuously, collect utilization data 140 from the VM instance 114 that indicates a change in the resource-utilization characteristics of the workload 122.

In light of such modifications or changes, the optimization service 106 may continually, or periodically, analyze the utilization data 140 of the workload 122 and determine if resource consumption has changed such that a new VM instance type 132 is more appropriate for the workload 122 than the current VM instance type 132 (e.g., VM instance 114). In other examples, the service provider 104 may develop and offer new VM instance type(s) 132 to increase the offerings of VM instance types 132 for users 116. The optimization service 106 may use various techniques, such as workload simulation, to determine that the new VM instance type 132 is more optimized for the workload 122 based on the suitability score than the currently utilized VM instance type 132. For such reasons, and potentially other reasons, the optimization service 106 may provide the user account of the user 116 with additional recommendation data that includes a recommendation for the user 116 migrate their workload 122 from the current VM instance type 132 to be hosted by a different VM instance type 132 that is more optimized for the resource consumption/utilization of the workload 122.

In such examples, the optimization service 106 may provide an instruction to the compute-management service 148 to migrate the workload 122 to be hosted on one or more VM instances 114(1)-(N) that correspond to the VM instance type 132 that was determined to be more optimized for the workload 122.

As described herein, a workload 122 may generally include a designated collection or grouping of computing resources (e.g., compute, memory, storage, networking, etc.), and the code or logic that performs functionality using the computing resources. The service provider network 102 may support a wide variety of workloads 122, such as web servers, databases, customer-facing applications, distributed data stores, batch processing, machine/deep learning interference, online gaming, video encoding, memory caching, and/or any other type of workload that can be supported by computing resources of the computing-resource network 110.

Generally, the optimization service 106, and components thereof, may comprise software, firmware, and/or other logic that is supported one computing device, or across more computing devices in the service provider network 102. Additionally, the optimization service 106 may comprise a system of other devices.

Figure 2:
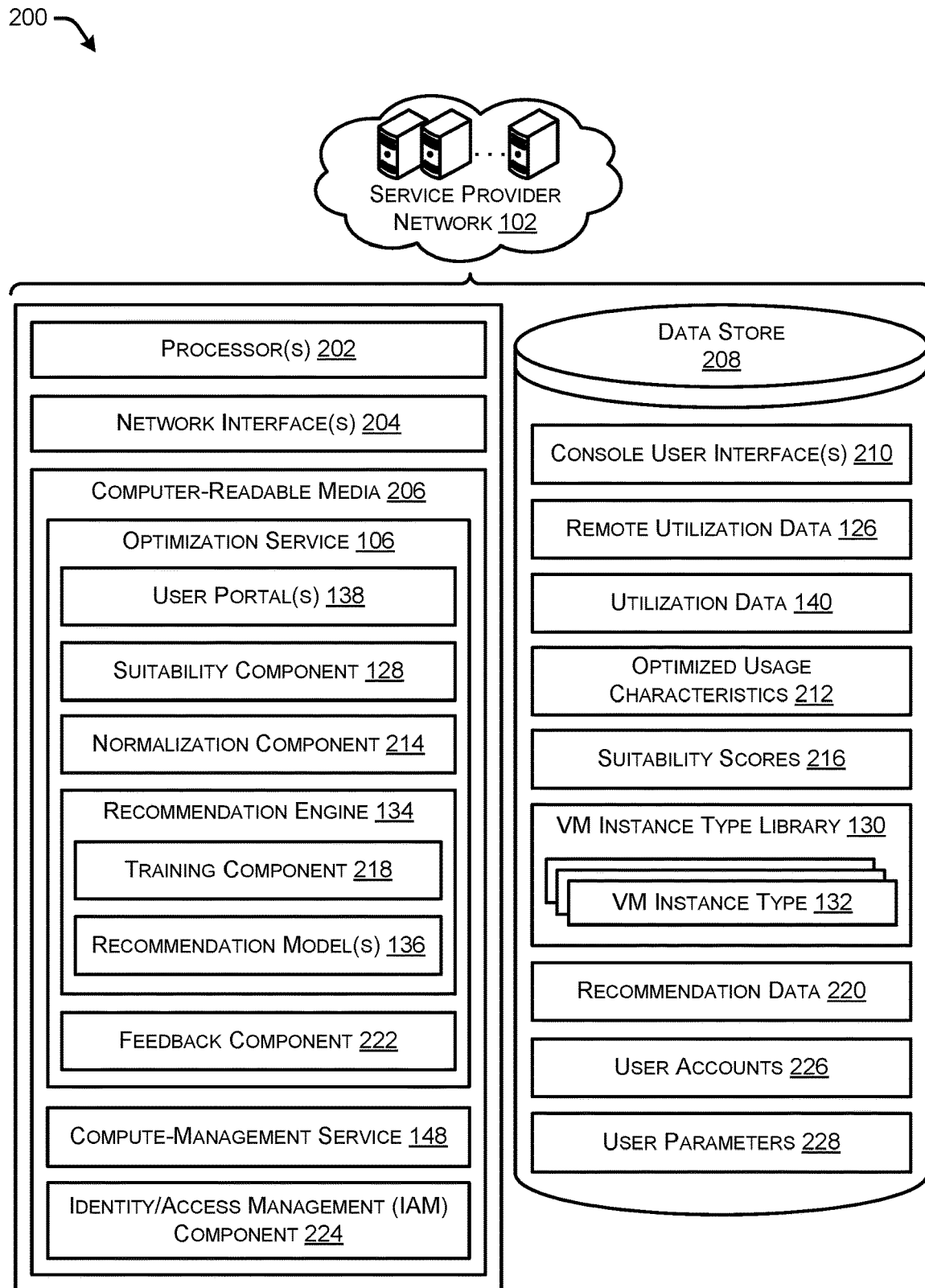
FIG. 2 illustrates a component diagram of example components of a service provider network that determines suitability scores for VM instance types running workloads, determines optimized VM instance types for running workloads, and recommends the optimized VM instance types to users.

FIG. 2 illustrates a component diagram 200 of example components of a service provider network 102 that determines suitability scores for VM instance types 132 running workloads 122, determines optimized VM instance types 132 for running workloads 122, and recommends the optimized VM instance types 132 to users 116.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s) 118, computing devices 112, and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS® SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the optimization service 106 described herein. For instance, the computer-readable media 206 may store the user portal(s) 138 through which users 116 can provide input via their user accounts and user devices 118. In some examples, the user portal(s) 138 include an interface through which users 116 can upload remote utilization data 126 from on-premise or other remote resource networks 108 that hosted their workload 122. Additionally, the user portal(s) 138 may include a web-console wizard which presents one or more console user interface(s) 210 (or UIs 210) by which the users 116 may view their dashboard 142.

The computer-readable media 206 may further store the suitability component 128 configured to determine suitability scores 216 indicating how suitable a VM instance 132 is for supporting a workload 122. The suitability component 128 may receive remote utilization data 126 and/or utilization data 140 and determine suitability of VM instances 132 for workloads 122 based on usage characteristics across resource types. In some instances, a normalization component 214 may be utilized to normalize values representing suitability scores 216 to put them in a format that is easily digestible by a user 116.

The computer-readable media 206 may further store a recommendation engine 134 that includes the recommendation models 136 that are utilized to generate recommended VM instance types 132. The training component 218 of the recommendation engine 134 may be configured to train the recommendation models 136 using various utilization data 140. The training component 218 is described in further detail with respect to FIG. 4. The recommendation engine 134 may generate and output recommendation data 220 representing the VM instance types 132 that are determined as suitable/optimal for supporting a workload 122 at issue. The recommendation data 220 may be output to a user device 118 and rendered on a display of the device 118.

The recommendation engine 134 may generate recommendation data 220 including a VM instance type listing (e.g., ranked list of VM instance types 132 based on suitability for the workload 122), and/or suitability scores 216 that indicate how suitable or optimized a VM instance type 132 is for the workload 122. The recommendation engine 134 may, if the user 116 opts in for a recommendation, provide recommendation data 220 to the user devices 118 to help users 116 select a VM instance type 132 on which to initially launch a workload 122, and/or as the workload 122 becomes more suitable to be supported by different VM instance types 132 throughout the life of the workload 122.

The computer-readable media 206 may further store a simulation component that simulates workloads 122 on VM instances 114. For instance, rather than using actual utilization data 140, the simulation component may simulate consumption by different workloads 122 on different VM instance types 132 in order to determine what workloads 122 are optimized for what VM instance types 132 (e.g., throughput compared to allocated computing resources). Additionally, the simulation component may simulate workloads 122 on new VM instance types 132 that have been introduced by the service provider 104 for use by the users 116. For example, the simulation component may simulate the consumption of different workloads 122 on the new VM instance types 132, and determine performance metrics that indicate throughput of data for amounts of computing resources input into the new VM instances 114.

The computer-readable media 206 may further store code for the compute-management service 148, which may be implemented by one, or multiple, computing devices 112 of the service provider network 102. Generally, the compute-management service 148 may be a service of the service provider network 102 that provides secure, resizable compute capacity and manages the computing resources of the computing-resource network 110. In some examples, the compute-management service 148 may perform various functions for managing the computing-resource network 110, such as provisioning VM instances 114, migrating workloads 122 between VM instances 114, providing auto-scaling for fleets of VM instances 114, configuring VM instances 114 and/or workloads 122, and/or performing any other functions for managing the computing-resource network 110. In some instances, the compute-management service 148 may receive commands from the optimization service 106 for managing the workloads 122 and/or VM instances 114 for users 116 of the service provider network 102.

In some examples, the compute-management service 148 may include an auto-scaling component that, when executed by the processor(s) 202, scales up or down the number of instances 114 available to support one or more workloads 122. For example, the auto-scaling component may provide a fast, efficient, and accurate way to match fleet capacity to usage. In some examples, the auto-scaling component may track the fleet's hosting metrics and determine when to add or remove instances 114 based on a set of guidelines, called policies. The auto-scaling component can adjust capacity in response to changes in demand to help ensure that the fleet of instances 114 has availability for bursts without maintaining an excessive amount of idle resources.

To utilize the services provided by the service provider network 102, users 116 may register for an account with the service provider network 102. For instance, users 116 may utilize a user device 118 to interact with an identity and access management (IAM) component 224 that allows the users 116 to create user accounts 226 with the service provider network 102. Generally, the IAM component 224 may enable the users 116 to manage their workloads 122 and other computing resources securely. Using the IAM component 224, the users 116 may manage their VM instances 114 as described herein. Additionally, users 116 may perform various operations for interacting with the optimization service 106 via their user accounts 226, such as providing workload data 120, receiving recommendation data 132, proving input data indicating selections of VM instance types 132, and/or other interactions may be authorized via credentials required to access the user accounts 226.

In some examples, the data store 208 may store one or user parameters 228 for the user accounts 226 that indicate preferences for the users' 116 workloads 122 and the supporting VM instance types 132. For example, a user 116 may provide user parameters 228 that indicate their preference to have "optimal" resource usage for a VM instance 132 vary from what is determined by suitability component 128 and/or the recommendation engine 134. For instance, a user 116 may provide user parameters 228 that indicate the users 116 would like more flexibility in usage ranges, less flexibility in usage ranges, and so forth.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
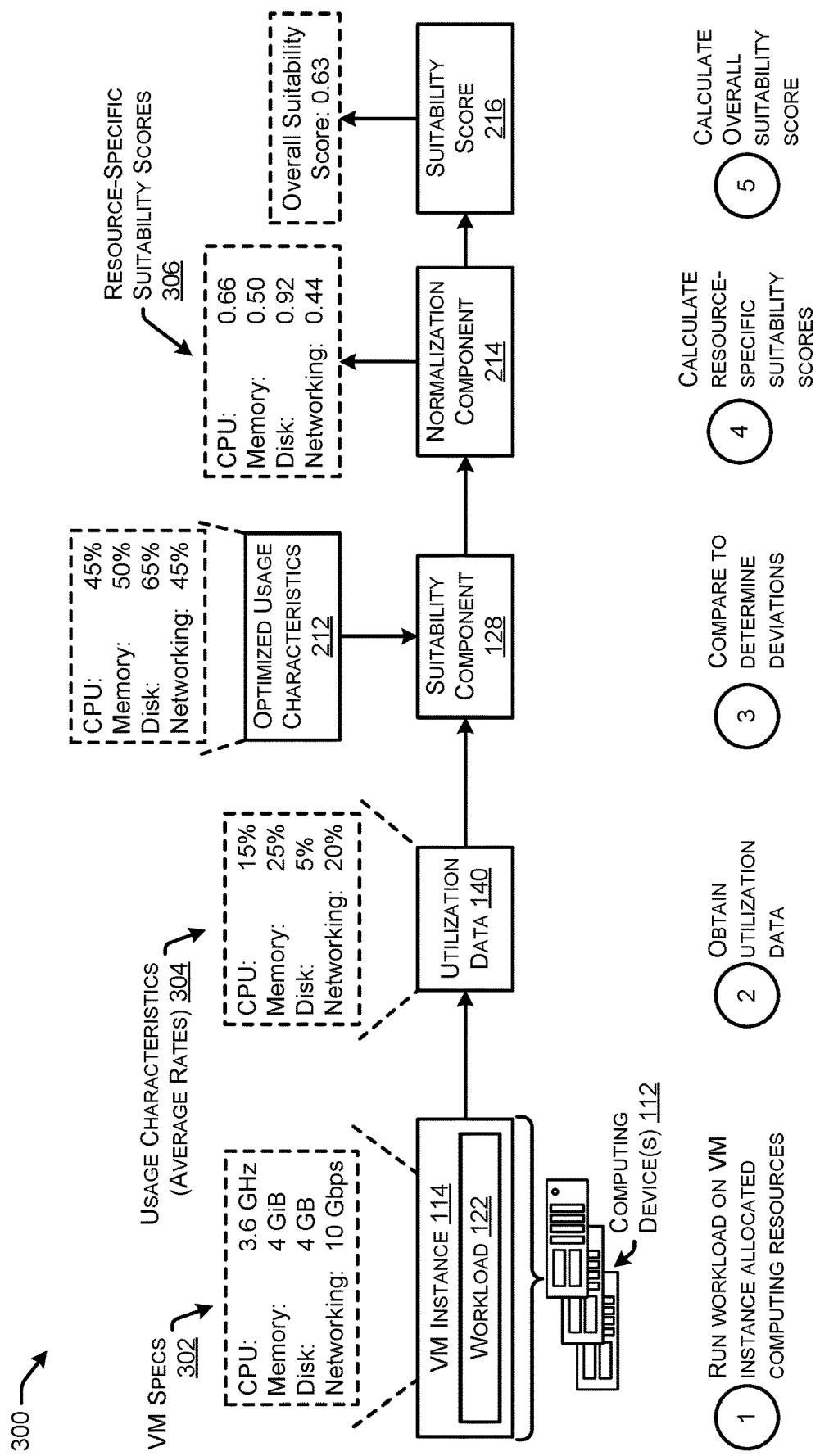
FIG. 3 illustrates a flow diagram of an example method for determining a suitability score for a VM instance type running a workload based on utilization data indicating usage of computing resources by the workload.

FIG. 3 illustrates a flow diagram 300 of an example method for determining a suitability score for a VM instance type running a workload based on utilization data indicating usage of computing resources by the workload.

At "1," the VM instance 114 may be running a workload 122 on a computing device 112. Generally, the VM instance 114 may be allocated a portion of the computing device 112 and other resources, as illustrated by the VM specifications 302. In some examples, the computing device(s) 112 running the VM instance 114 that is executing the workload 122 may correspond to the remote VM instance 120 running the remote workload 122 in the remote resource network 108. In other examples, the computing device(s) 112 running the VM instance 114 that is executing the workload 122 may be included in the computing-resource network 110 of the service provider network 102. Thus, in some examples the flow diagram 300 may represent determining suitability scores 146 for workloads 122 running on remote VM instances 120 in a remote resource network 108, and the flow diagram 300 may also represent determining suitability scores 146 for the workload 122 running on a VM instance 114 supported by the computing-resource network 110 in the service provider network 102.

The VM instance 114 may output, at "2", utilization data 140 that indicates usage characteristics (e.g., average usage rates) 304 for one or more resource types used by the workload 122 running on the VM instance 114. The utilization data 140 may be provided to a suitability component 128 that is provided with optimized usage characteristics 212. The optimized usage characteristics 212 may indicate usage rates that are optimized for workloads 122 running on the particular VM instance type 132. In some examples, to determine the optimized usage characteristics 212 the service provider 104 may define target values and/or target ranges that are considered optimal for workloads 122 running on VM instances 114. The optimized usage characteristics may generally represent ground truths for optimized usage of resources.

At "3," the suitability component 128 may compare the utilization data 140 to the optimized usage characteristics 212 to determine deviations of actual usage to optimized usage. At "4," the normalization component 214 may determine normalized, resource-specific suitability scores that indicate a suitability of the VM instance 114 for the workload 122 (e.g., normalized scores between "1" and "−1" where "0" indicates optimal). However, any scale may be utilized as described above. At "5," the normalization component 214 may output a suitability score 216 that indicates an overall suitability of, in this example, "−0.63." In this example, there may be sever under-utilization of the resources allocated to the workload 122 by the VM instance type 132, and the user 116 may determine to right-size to reduce waste.

Figure 4:
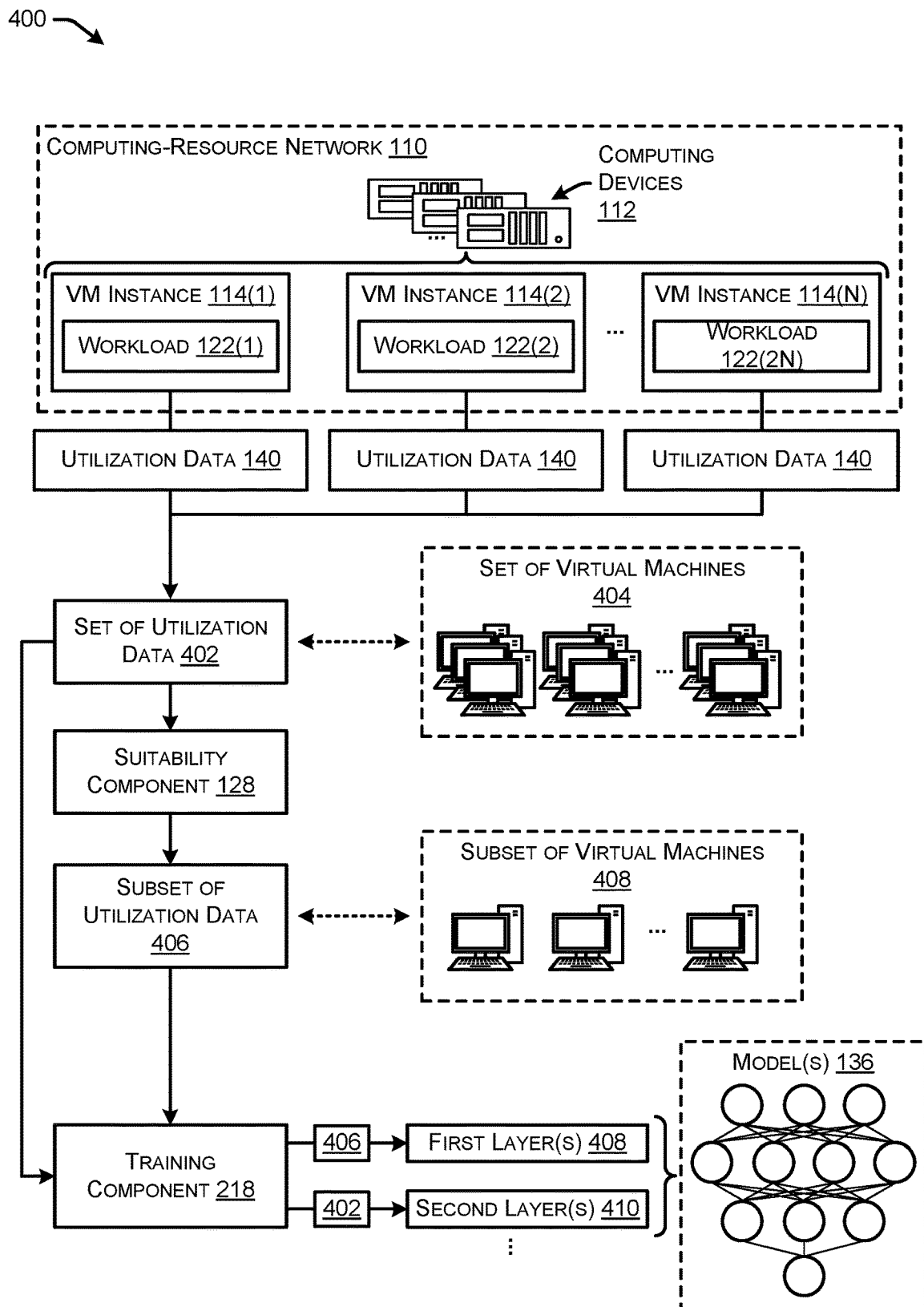
FIG. 4. illustrates a system-architecture diagram of a service provider network that utilizes utilization data for workloads running on VM instance types, filtering the utilization data based on optimized usage characteristics, and training a model to determine recommended VM instance types for workloads.

FIG. 4. illustrates a system-architecture diagram 400 of a service provider network 102 that utilizes utilization data for workloads running on VM instance types, filtering the utilization data based on optimized usage characteristics, and training a model to determine recommended VM instance types for workloads.

As illustrated, one or more VM instances 114 in the computing-resource network 110 that are running workloads 122 and output utilization data 140 to generate a set of utilization data 402. The set of utilization data 402 may be collected for a set of virtual machines 404. The suitability component 128 may, in some examples, filter the set of utilization data 402 based on suitability scores. For instance, utilization data 140 from the set 402 may be filtered based on the utilization data 140 having suitability scores that are within a threshold range of suitability, greater than a threshold value, less than a threshold value, etc. For instance, suitability scores for the set of utilization data 402 that are within a threshold distance to an optimized value, or fall within a range of optimized values, may be identified by the suitability component 128.

The suitability component 128 may then determine a subset of utilization data 406 that corresponds to a subset of virtual machines 408. The subset of utilization data 406 may be associated with suitability scores that are considered more optimal or suitable. The subset of utilization data 406 and/or the set of utilization data 402 may be utilized by a training component 218 to train the models 136. For instance, the training component 218 may train one or more first layers 408 using the set utilization data 402, and train one or more second layers 410 of the model 136 using the subset of utilization data 406 to "fine-tune" the model 136. In some examples, the set of utilization data 402 may be used to initially train one or more layers of the model(s) 136, and the subset of utilization data 406 may then be used to further train, or fine tune, the one or more layers of the model(s) 136. In some instances, the entire model(s) 136 may be initially trained using the set of utilization data 402, and then some or all of the layers of the model(s) 136 may be fine-tuned using the subset of utilization data 406. In other examples, one or more layers may be trained using the set of utilization data 402, and one or more different layers may be trained using the subset of utilization data 406. In some instances, the entire model(s) 136 may be trained using only the subset of utilization data 406, or only the set of utilization data 402.

In some examples, training the model(s) 136 may include extracting features from the utilization data 140 where the features comprise a latent representation information contained in time series data as a feature vector used for modeling the resource data 140 over time. The features vectors may be extracted using statistical methods, including percentiles, to describe the time series information for each computing resource. The extracted features may facilitate the fitting of the computing resources times series utilization data into model(s) 136 that are developed to make accurate instance type recommendations for various workload characterizations. In some examples, this "pre-training" may include normalizing the utilization data 140 coming from computing devices 112 that have different physical dimensions to allow for proper comparison for VM instance characteristics, and not computing device 112 characteristics. By not including the computing device 112 specification information in the feature selection, the model(s) 136 will infer a VM instance type 132 based on the workload 122 characterization, such as computing resource utilization and usage for that workload 122 configuration.

In some examples, the models 136 may comprise various types of models, such as a regular deep learning model with hidden layers, a deep learning model with a supervised pre-trained network, and/or a deep learning model with an unsupervised auto-encoder pre-trained network. These model(s) 136 may be trained to act as an instance type recommendation service that provides a list of recommended instance types 132 for a given workload 122 configuration. Thus, the training component 218 may makes use of pre-trained networks in the development of instance type recommendations models 136. A pre-trained network may allow the use all of the training data 140 during the pre-training phase and then use optimized data to fine tune the model 136. This may train the model 136 to capture all types of utilization data 140, those running within an optimal range (e.g., subset of utilization data 406) as well as those that are over or under provisioned (e.g., portions of the set of utilization data 402). The model 136 may be trained to identify all types of utilization data 149 and properly recommend instance types 132 for them that will run within an optimal range.

The training component 218 may utilize pre-training including supervised and unsupervised training. In supervised pre-training, the training component 218 may train a supervised network/model 136 with all of the utilization data 140, then add more hidden layers and fine-tune the network/model 136 and using optimized data 406. In unsupervised pre-training, the training component 218 may build an unsupervised auto-encoder model to learn new hidden latent representations of the workloads from all of the utilization data 402. Then the training component 218 may add more hidden layers and fine-tune the model 136 using optimized data 406 in a supervised fashion. Unsupervised pre-training may be used as there may be a larger number of unlabeled examples from all of the utilization data 402 that can be used to initialize a model 136 prior to using a much smaller number of optimized examples to fine tune the model 136 weights in a supervised fashion. For both the supervised and unsupervised pre-training, the training component 218 may test holding the weights in the prior layers constant, and fine-tuning all weights in the network 136 after the addition of the final layer.

In this way, the model 136 is trained to identify optimized VM instance types 132 for workloads 122 based on the workloads' 122 usage characteristic, and output the optimized VM instance types 132. In some examples, the set of utilization data 402 may be utilized alone to train the model 136, the subset of utilization data 406 may be utilized alone to train the model 136, and any combination of the sets of data 402/406 may be utilized in some examples.

FIGS. 5A, 5B, 6, 7A, 7B, 8, and 9 illustrate flow diagrams of example methods 500, 600, 700, 800, and 900 that illustrate aspects of the functions performed at least partly by the service provider network 102 as described in this disclosure. The logical operations described herein with respect to FIGS. 1-4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A, 5B, 6, 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

As described in FIGS. 5A, 5B, 6, 7A, 7B, 8, and 9, the term compute resource may generally comprise any type of compute resource, including physical/hardware compute resources (e.g., servers, chips, chipsets, processors, disks, RAM, ROM, etc.), and/or virtual resources (e.g., virtual machine instances, containers, etc.). Thus, the techniques are generally applicable for recommending compute resources, which could comprise a hardware resource for running the workload, a virtual resource for running the workload, any combination thereof, etc.

Figure 5A:
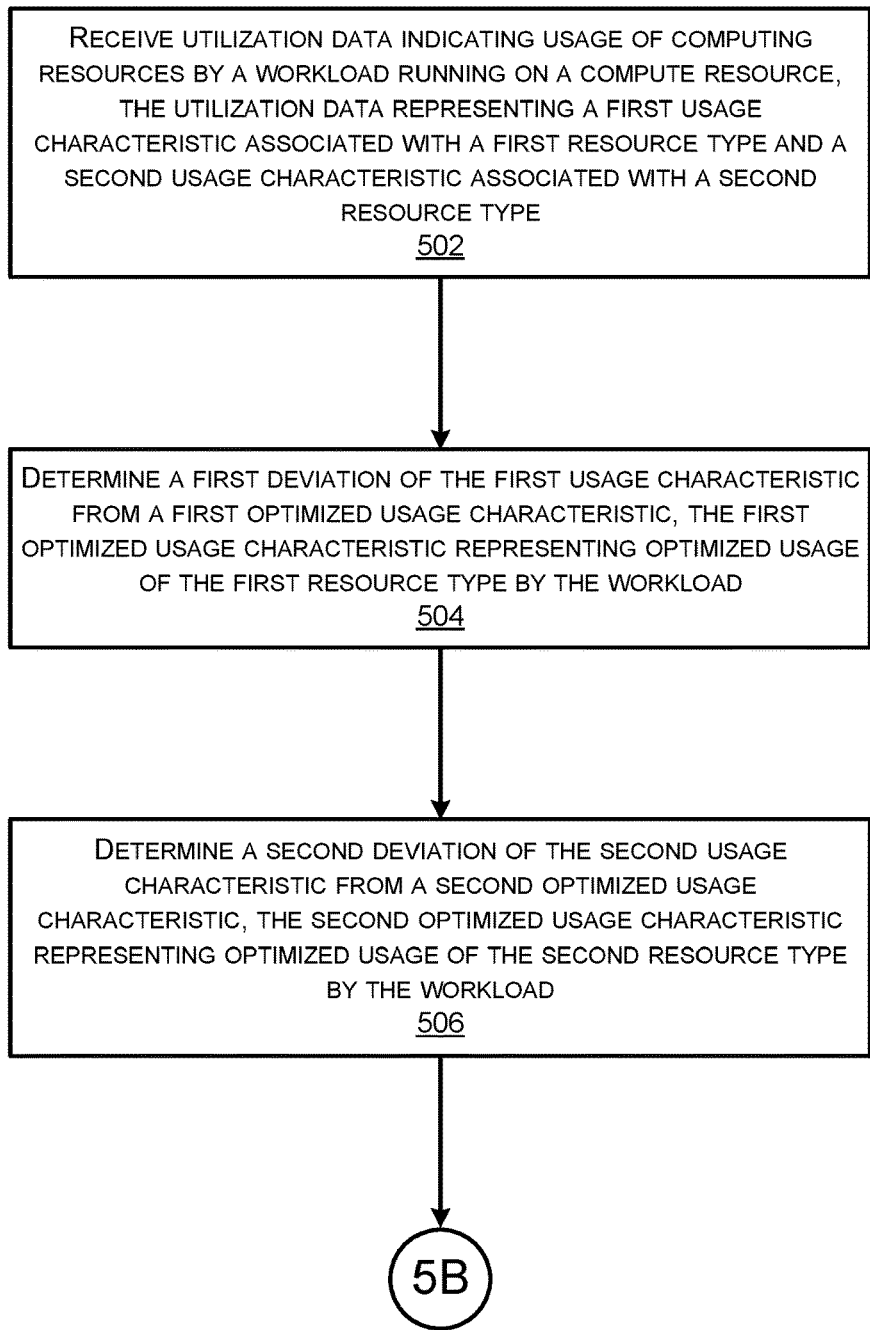
FIGS. 5A and 5B collectively illustrate a flow diagram of an example method for a service provider network to determine an overall suitability score for a virtual resource running a workload based partly on deviations in usage characteristics from optimized usage characteristics.
Figure 5B:
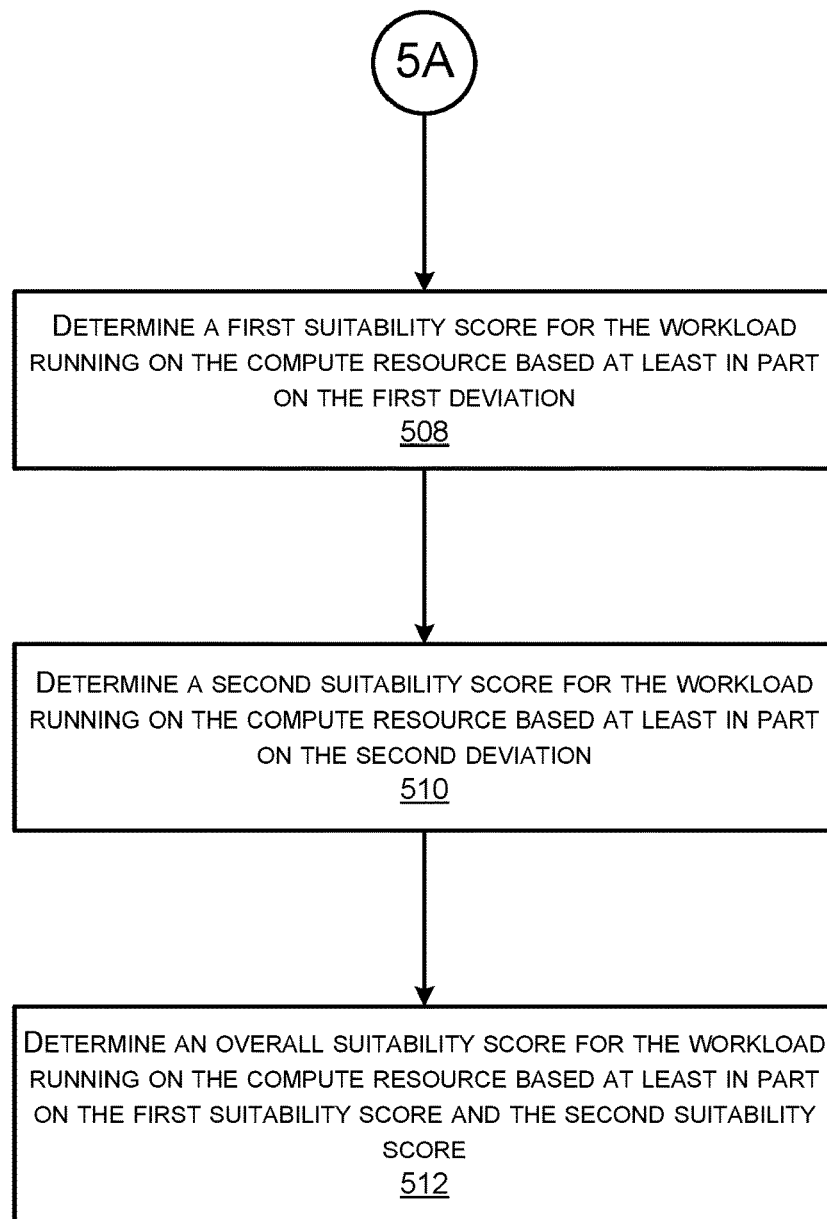

FIGS. 5A and 5B collectively illustrate a flow diagram of an example method for a service provider network to determine an overall suitability score for a compute resource running a workload based partly on deviations in usage characteristics from optimized usage characteristics.

At 502, a service provider network 102 may receive utilization data 140 indicating usage of computing resources 110 by a workload 122 running on a compute resource 114. In examples, the utilization data 140 may represent a first usage characteristic representing usage of a first resource type of the computing resources 112 by the workload 122, and a second usage characteristic representing usage of a second resource type of the computing resources 110 by the workload 122.

At 504, the service provider network 102 may determine a first deviation of the first usage characteristic from a first optimized usage characteristic 212. Generally, the first optimized usage characteristic 212 may represent optimized usage of the first resource type by the workload 122.

In some examples, the first usage characteristic may comprise at least one of an average usage rate of the first resource type by the workload, a highest usage rate of the first resource type by the workload, or a lowest usage rate of the first resource type by the workload. Further, the first optimized usage characteristic may comprise at least one of an optimized average usage rate of the first resource type by the workload 122 running on an optimized compute resource, an optimized highest usage rate of the first resource type by the workload running on the optimized compute resource, or an optimized lowest usage rate of the first resource type by the workload running on the optimized compute resource.

At 506, the service provider network 102 may determine a second deviation of the second usage characteristic from a second optimized usage characteristic 212. Generally, the second optimized usage characteristic 212 may represents optimized usage of the second resource type by the workload 122.

At 508, the service provider network 102 may determine a first suitability score 216 for the workload 122 running on the compute resource 114 based at least in part on the first deviation. At 510, the service provider network 102 may determine a second suitability score 216 for the workload 122 running on the compute resource 114 based at least in part on the second deviation. At 512, the service provider network 102 may determine an overall suitability score 216 for the workload 122 running on the compute resource 114 based at least in part on the first suitability score 122 and the second suitability score 122.

In some instances, the first resource type comprises one of a central processing unit (CPU) resource type, a memory resource type, a storage resource type, a network availability resource type, or a graphics processing unit (GPU) resource type, and the second resource type comprises another one of the CPU resource type, the memory resource type, the storage resource type, the network availability resource type, or the GPU resource type.

In examples, the utilization data 140 further indicates a third usage characteristic representing usage of the second resource type by the workload 122. In examples, the method 500 further comprises determining a third deviation of the third usage characteristic from a third optimized usage characteristic representing optimized usage of the second resource type by the workload, and determining a third suitability score for the workload running on the compute resource based at least in part on the third deviation. Further, the method 500 may comprise determining an aggregate suitability score for the usage of the second resource type by the workload based at least in part on the second suitability score and the third suitability score and determining the overall suitability score for the workload running on the compute resource is further based at least in part on the aggregate suitability score.

FIG. 6 illustrates a flow diagram of an example method 600 for a service provider network 102 to determine an overall suitability score 216 for a compute resource 114 running a workload 122 based partly on usage characteristics indicating usage of computing resources 110 by the workload. In some examples, the techniques of method 600 (and other methods) may be performed by a system comprising one or more processors and one or more computer-readable media storing computer-executable instructions that, when executed by the one or more processors, cause the one or more processors to perform the operations of method 600.

At 602, a service provider network 102 may obtain utilization data 140 indicating usage of a computing resource 110 by a workload 122 running on a compute resource 112. In such examples, the utilization data 140 may represent a first usage characteristic representing usage of the computing resource 110 by the workload 122, and a second usage characteristic representing usage of the computing resource 110 by the workload 122.

In some examples, the first usage characteristic represents an average usage rate of the computing resource 110 by the workload 122, and the second usage characteristic represents at least one of a highest usage rate of the computing resource 110 by the workload 122 or a lowest usage rate of the computing resource 110 by the workload 112.

At 604, the service provider network 102 may determine a first suitability score 216 for the workload 122 running on the compute resource 114 based at least in part on the first usage characteristic. At 606, the service provider network 102 may determine a second suitability score 216 for the workload 122 running on the compute resource 114 based at least in part on the second usage characteristic.

In some instances, the method 600 may further comprise determining a first difference between the first usage characteristic and a first optimized usage characteristic representing optimized usage of the computing resource by the workload, and determining a second difference between the second usage characteristic and a second optimized usage characteristic representing optimized usage of the computing resource by the workload. In such examples, the first suitability score is determined based at least in part on the first difference and the second suitability score is determined based at least in part on the second difference.

At 608, the service provider network 102 may determine an overall suitability score 216 for the workload 122 running on the compute resource 114 based at least in part on the first suitability score 216 and the second suitability score 216.

In some instances, the method 600 may further include receiving user input from a user account associated with the workload, where the user input indicating an optimization preference for the first usage characteristic, and determining the first optimized usage characteristic based at least in part on the optimization preference.

Figure 7A:
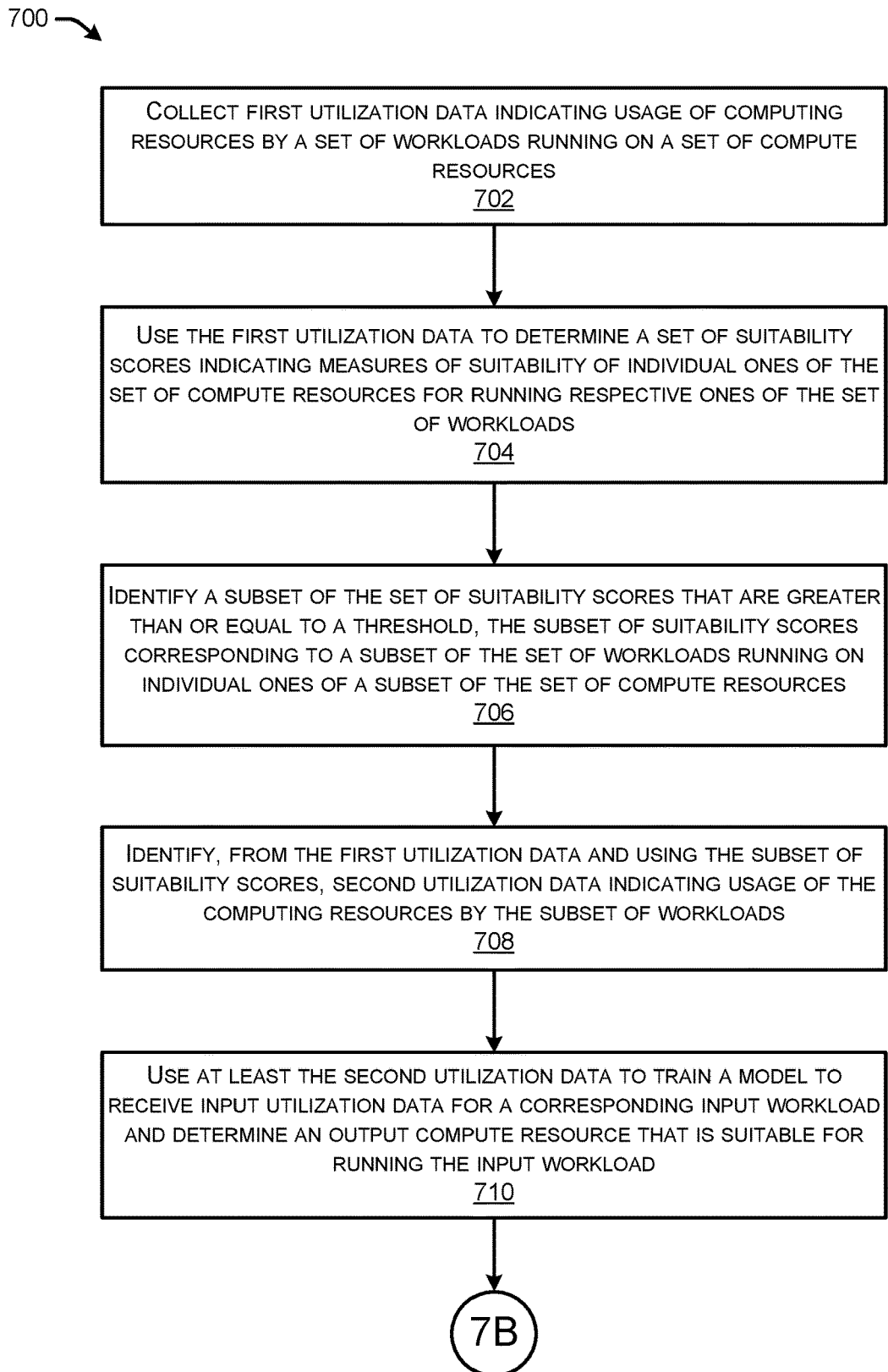

FIGS. 7A and 7B collectively illustrate a flow diagram of an example method 700 for a service provider network to collect utilization data for workloads running on compute resources, filtering the utilization data based on optimized usage characteristics, and training a model to determine recommended VM instance types for workloads.

In some examples, the techniques of method 700 are performed by a system that includes computing resources, of a service provider network, that support a set of compute resources, individual ones of the set of compute resources running respective ones of a set of workloads. The system may further include one or more processors, and one or more computer-readable media storing computer-executable instructions that, when executed by the one or more processors, cause the one or more processors to perform the steps of method 700.

At 702, the service provider network 102 may collect first utilization data indicating usage of the computing resources by the set of workloads running on the set of compute resources.

At 704, the service provider network 102 may use the first utilization data to determine a set of suitability scores indicating measures of suitability of individual ones of the set of compute resources for running respective ones of the set of workloads At 706, the service provider network 102 may identify a subset of the set of suitability scores that are greater than or equal to a threshold, the subset of suitability scores corresponding to a subset of the set of workloads running on individual ones of a subset of the set of compute resources/

At 708, the service provider network 102 may identify, from the first utilization data and using the subset of suitability scores, second utilization data indicating usage of the computing resources by the subset of workloads.

At 710, the service provider network 102 may use at least the second utilization data to train a model to receive input utilization data for a corresponding input workload and determine an output compute resource that is suitable for running the input workload.

At 712, the service provider network 102 may receive third utilization data associated with usage of remote computing resources by a user workload running on a remote compute resource, where the remote computing resources being located in a remote resource network that is outside the service provider network/

At 714, the service provider network 102 may use the model and the third utilization data to determine an optimized compute resource for running the user workload, the optimized compute resource being provided by the service provider network.

At 716, the service provider network 102 may provide a user account associated with the user workload with a recommendation to migrate the user workload from the remote compute resource to the optimized compute resource.

At 718, the service provider network 102 may receive a request from the user account to migrate the user workload to the optimized compute resource. At 720, the service provider network 102 may cause the user workload to run on the optimized compute resource that is supported by the computing resources of the service provider network.

Figure 8:
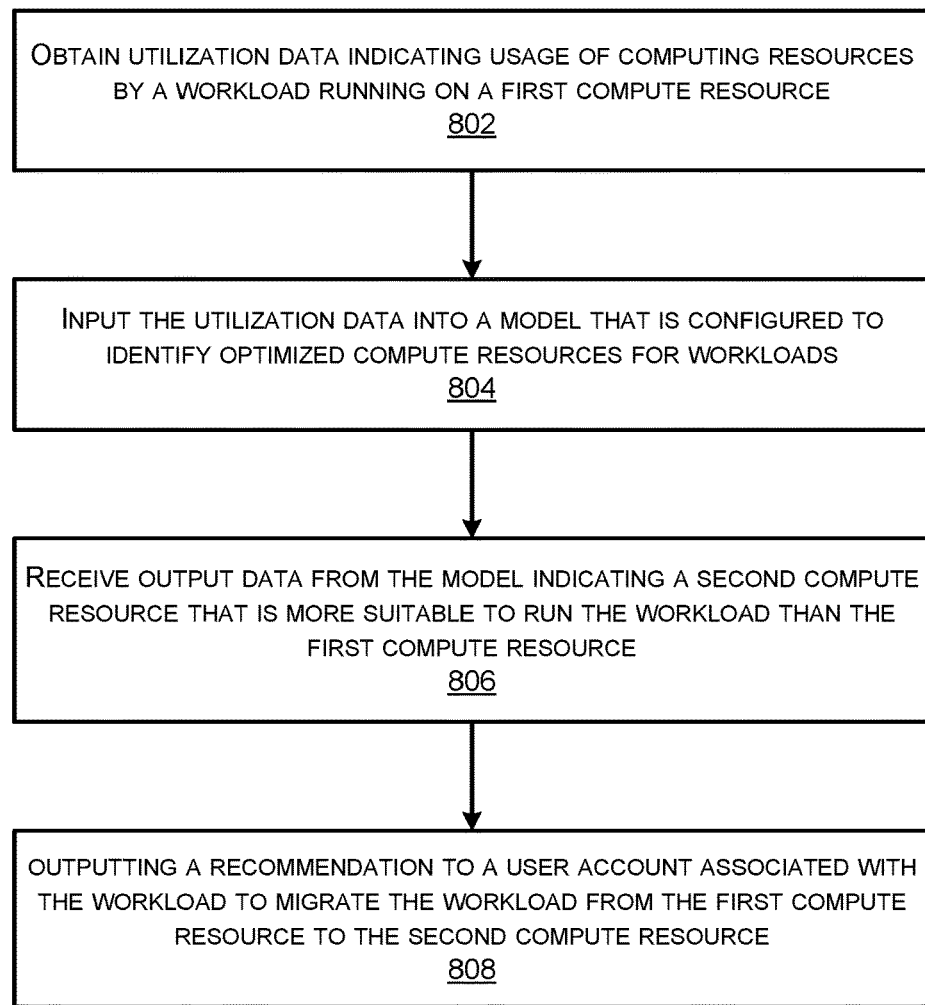
FIG. 8 illustrates a flow diagram of an example method for a service provider network to input utilization data into a model to identify a virtual resource that is optimized for a workload.

FIG. 8 illustrates a flow diagram of an example method 800 for a service provider network to input utilization data into a model to identify a compute resource that is optimized for a workload.

At 802, the service provider network 102 may obtain utilization data indicating usage of computing resources by a workload running on a first compute resource. At 804, the service provider network 102 may input the utilization data into a model that is configured to identify optimized compute resources for workloads. At 806, the service provider network 102 may receive output data from the model indicating a second compute resource that is more suitable to run the workload than the first compute resource. At 808, the service provider network 102 may output a recommendation to a user account associated with the workload to migrate the workload from the first compute resource to the second compute resource.

Figure 9:
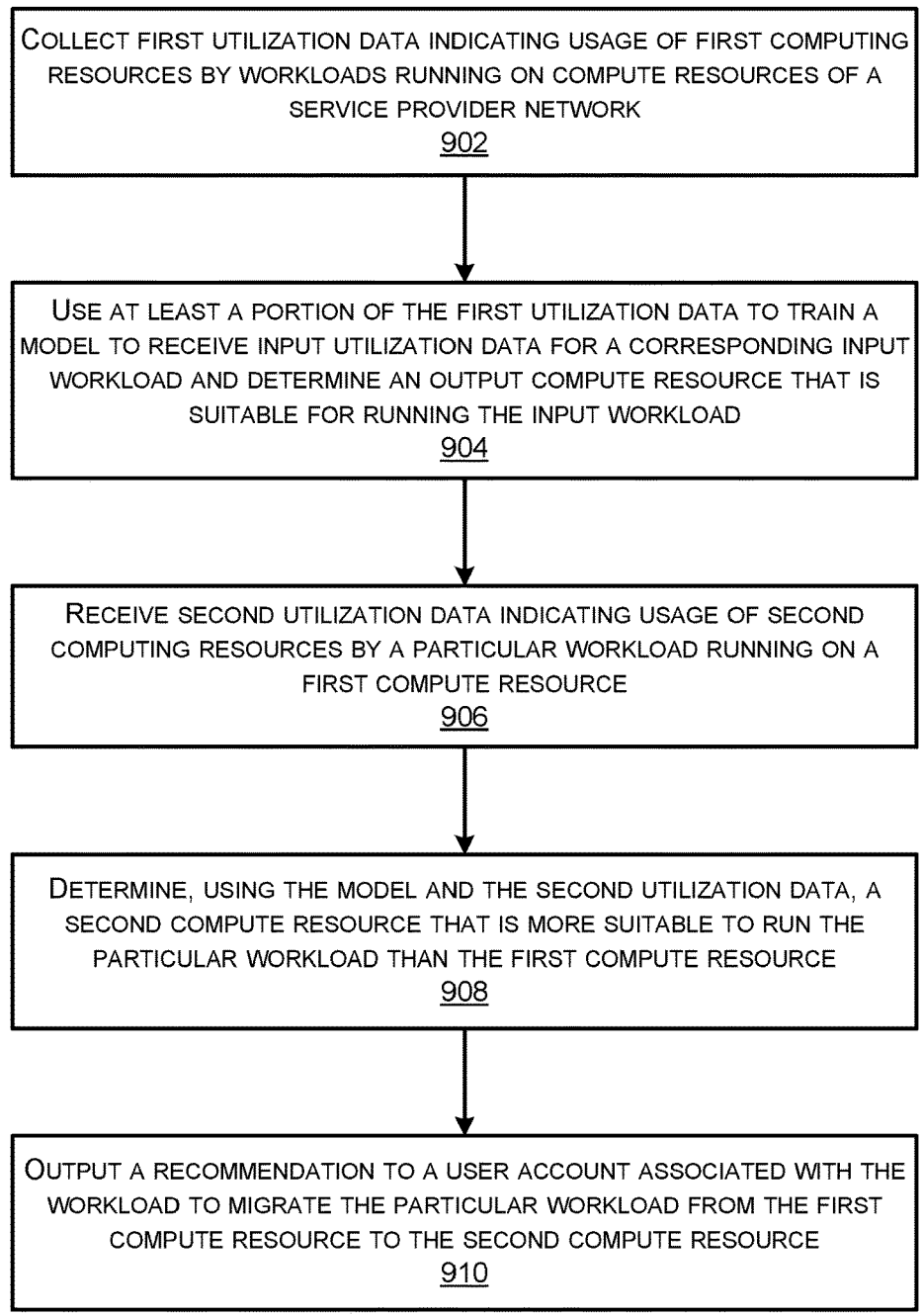
FIG. 9 illustrates a flow diagram of an example method for a service provider network to use utilization data to train a model to identify optimized virtual resources for workloads, and further use the model to identify a virtual resource optimized to run a workload.

FIG. 9 illustrates a flow diagram of an example method 900 for a service provider network to use utilization data to train a model to identify optimized compute resources for workloads, and further use the model to identify a compute resource optimized to run a workload.

At 902, the service provider network 102 may collect first utilization data indicating usage of first computing resources by workloads running on compute resources of a service provider network. At 904, the service provider network 102 may use at least a portion of the first utilization data to train a model to receive input utilization data for a corresponding input workload and determine an output compute resource that is suitable for running the input workload. At 906, the service provider network 102 may receive second utilization data indicating usage of second computing resources by a particular workload running on a first compute resource. At 908, the service provider network 102 may determine, using the model and the second utilization data, a second compute resource that is more suitable to run the particular workload than the first compute resource. At 910, the service provider network 102 may output a recommendation to a user account associated with the workload to migrate the particular workload from the first compute resource to the second compute resource.

Figure 10:
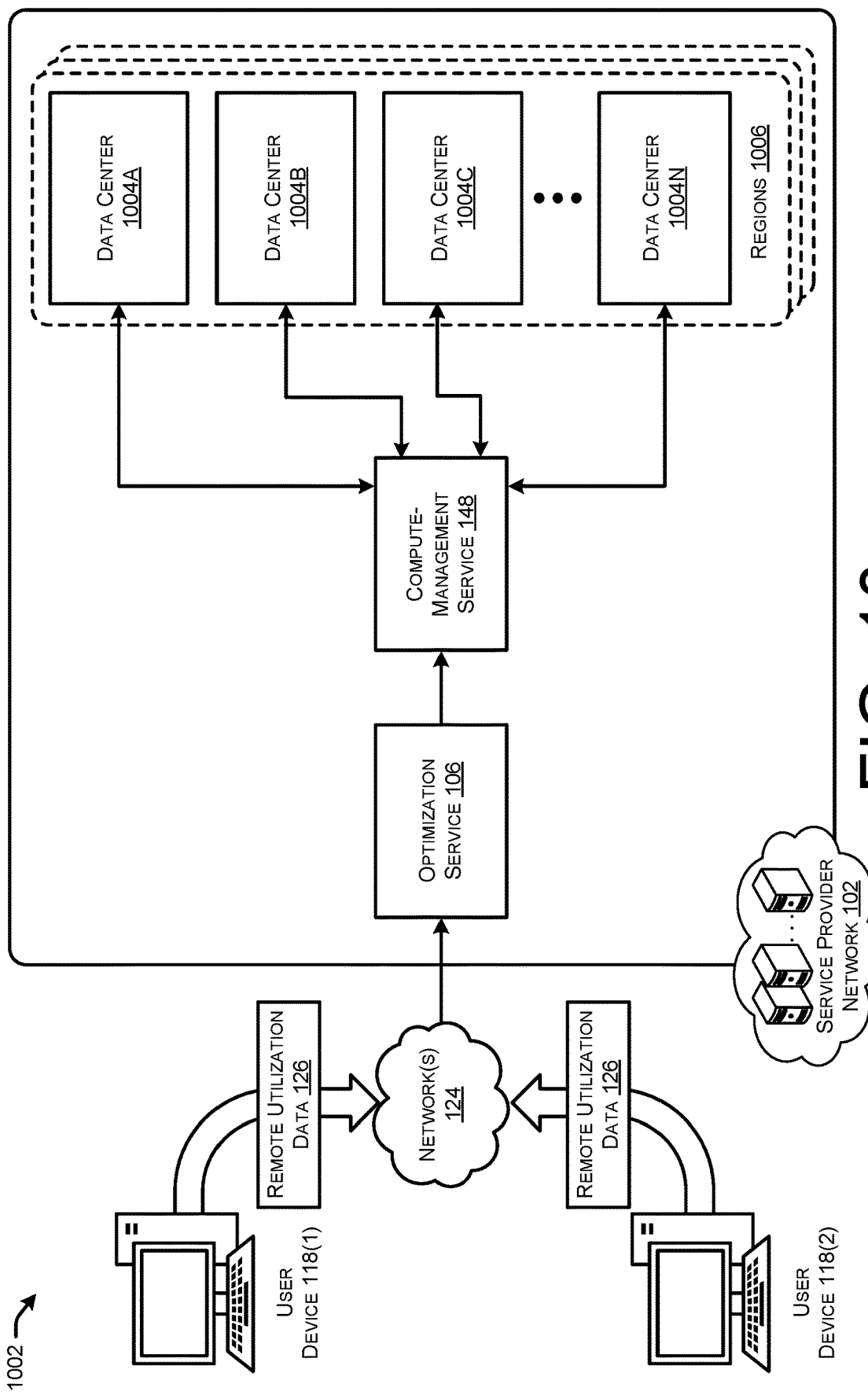
FIG. 10 is a system and network diagram that shows an illustrative operating environment that includes data centers of a service provider network that can be configured to implement aspects of the functionality described herein.

FIG. 10 is a system and network diagram that shows an illustrative operating environment that includes data centers a service provider network 102 that can be configured to implement aspects of the functionality described herein. The service provider network 102 can provide computing resources, like VM instances and storage, on a permanent or an as-needed basis. Among other types of functionality, the computing resources 110 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The users 116 of the user devices 118 that utilize the service provider network 102 may access the computing resources provided by the service provider network 102 over any wired and/or wireless network(s) 124, which can be a wide area communication network ("WAN"), such as the Internet, an intranet or an Internet service provider ("ISP") network or a combination of such networks. For example, and without limitation, a user device 118 operated by a user 116 of the service provider network 102 may be utilized to access the service provider network 102 by way of the network(s) 124. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
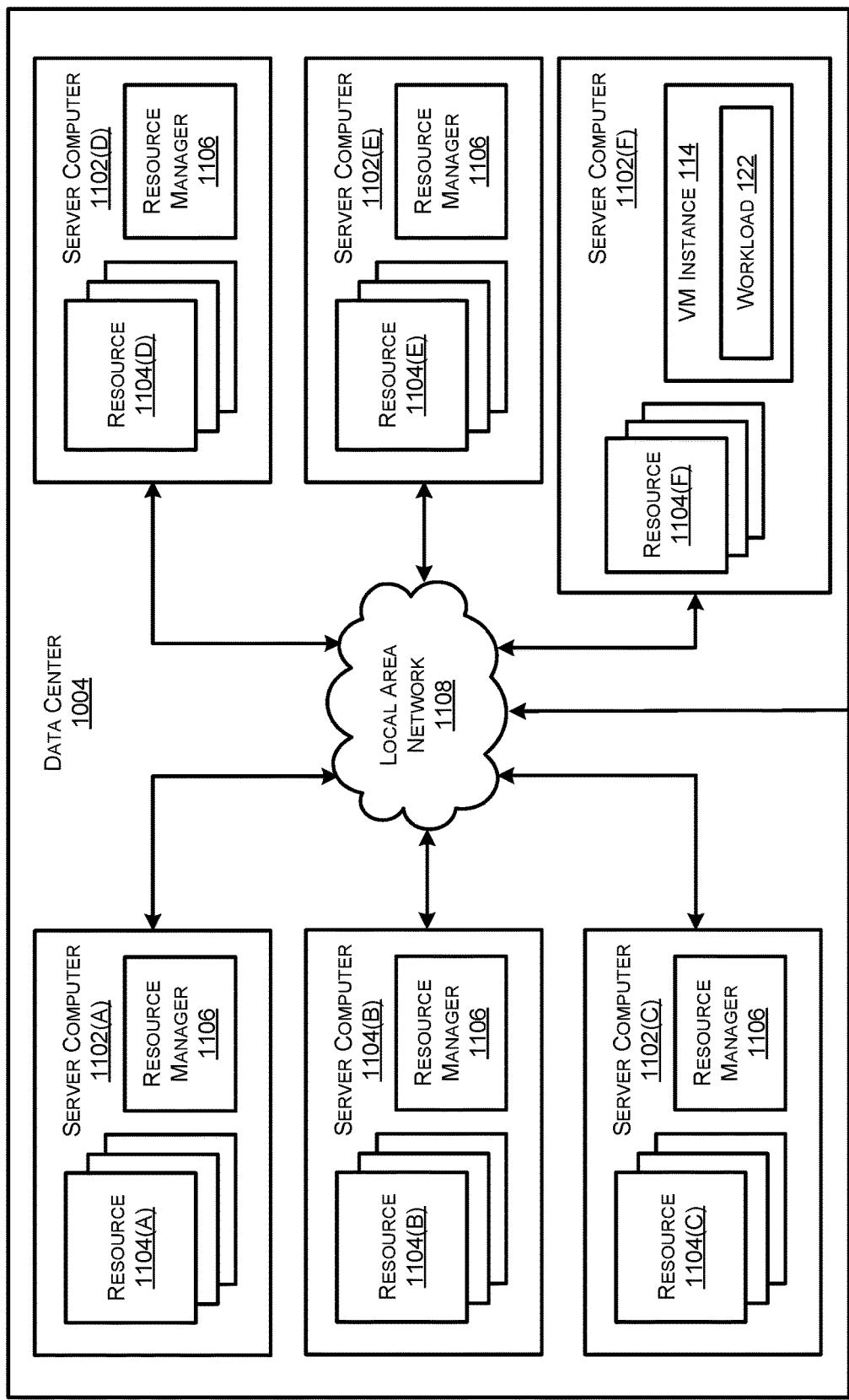
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices 112 described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

The data center 1004 shown in FIG. 11 also includes a server computer 1102F that can execute some or all of the software components described above. For example, and without limitation, the server computer 1102F (and the other server computers 1102) can generally be included in to the computing devices 112 of FIG. 1 and be configured to execute components, including the components of the optimization service 106, the compute-management service 148, the computing-resource network 110, and/or the other software components described above. The server computer 1102F can also be configured to execute other components and/or to store data for providing some or all of the functionality described herein. In this regard, it should be appreciated that the services illustrated in FIG. 11 as executing on the server computer 1102F can execute on many other physical or virtual servers in the data centers 1104 in various embodiments.

Figure 12:
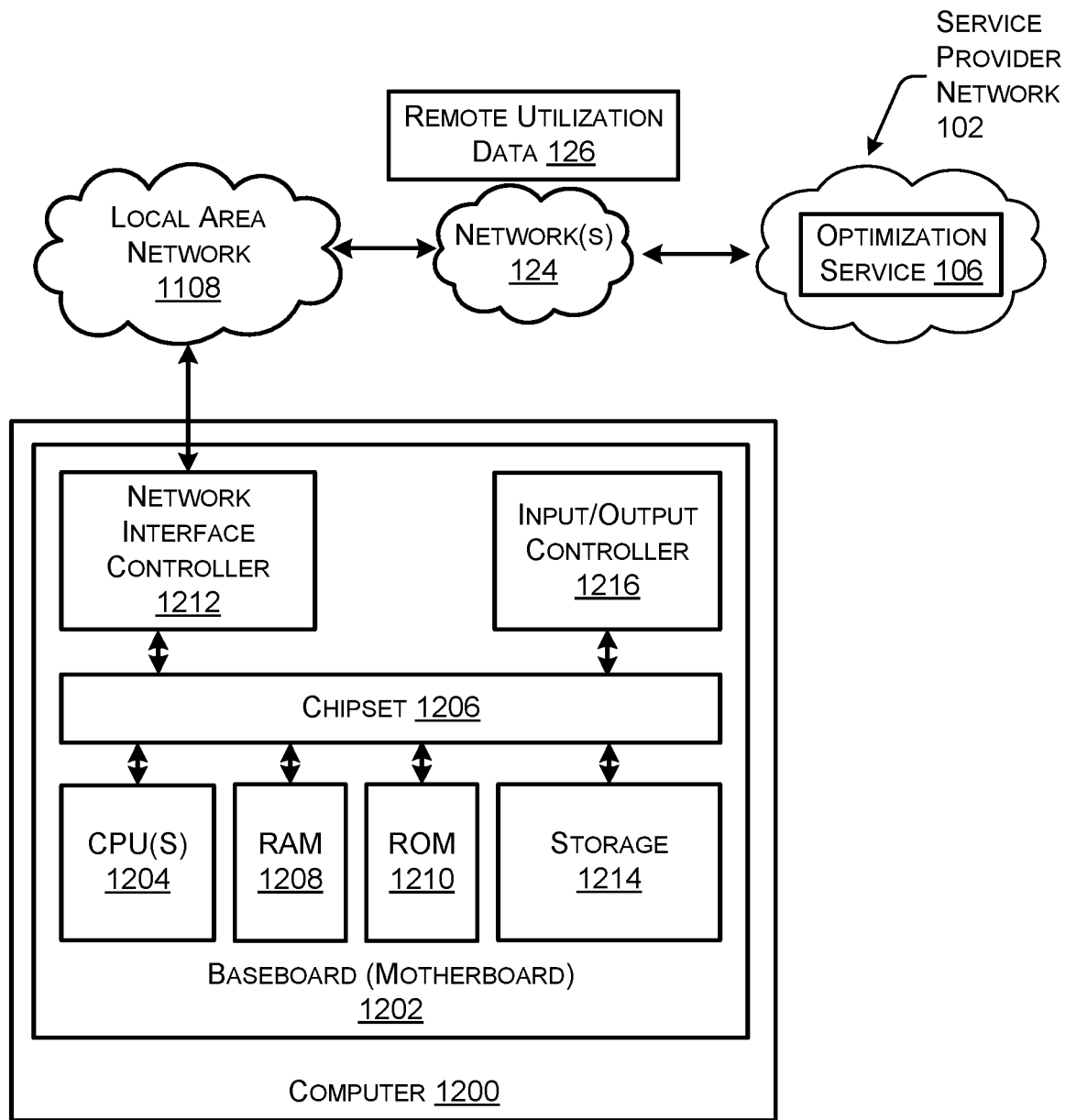
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. In some examples, the server computer 1200 may correspond to, or be the same as or similar to, a computing device 112 described in FIG. 1.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 2208. The chipset 1206 can include functionality for providing network connectivity through a network interface controller (NIC) 1212, such as a gigabit Ethernet adapter. The NIC 1212 is capable of connecting the computer 1200 to other computing devices over the network 2208 (or 124). It should be appreciated that multiple NICs 1212 can be present in the computer 1200, connecting the computer to other types of networks and remote computer systems.

The computer 1200 can be connected to a mass storage device 1218 that provides non-volatile storage for the computer. The mass storage device 1218 can store an operating system 1220, programs 1222, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system utilized to control the operation of the computer 1200. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1218 can store other system or application programs and data utilized by the computer 1200.

In one embodiment, the mass storage device 1218 or other computer-readable storage media is encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
    computing resources, of a service provider network, that support a set of compute resources, individual ones of the set of compute resources running respective ones of a set of workloads;
    one or more processors; and
    one or more computer-readable media storing computer-executable instructions that, when executed by the one or more processors, cause the one or more processors to:
        collect first utilization data indicating usage of the computing resources by the set of workloads running on the set of compute resources;
        use the first utilization data to determine a set of suitability scores indicating measures of suitability of individual ones of the set of compute resources for running respective ones of the set of workloads;
        identify a subset of the set of suitability scores that are greater than or equal to a threshold, the subset of suitability scores corresponding to a subset of the set of workloads running on individual ones of a subset of the set of compute resources;
        identify, from the first utilization data and using the subset of suitability scores, second utilization data indicating usage of the computing resources by the subset of workloads;
        use at least the second utilization data to train a model to receive input utilization data for a corresponding input workload and determine an output compute resource that is suitable for running the input workload;
        receive third utilization data associated with usage of remote computing resources by a user workload running on a remote compute resource, the remote computing resources being located in a remote resource network that is outside the service provider network;
        use the model and the third utilization data to determine an optimized compute resource for running the user workload, the optimized compute resource being provided by the service provider network;
        provide a user account associated with the user workload with a recommendation to migrate the user workload from the remote compute resource to the optimized compute resource;
        receive a request from the user account to migrate the user workload to the optimized compute resource; and
        cause the user workload to run on the optimized compute resource that is supported by the computing resources of the service provider network.

2. The system of claim 1, wherein training the model includes:
    training a first layer of the model using the first utilization data; and
    training a second layer of the model using the second utilization data.

3. The system of claim 1, comprising further computer-executable instructions that, when executed by the one or more processors, cause the one or more processors to:
    use the third utilization data to determine a first suitability score indicating a measure of suitability of the remote compute resource for running the user workload, the first suitability score being less than the threshold;

provide the user account with an indication of the first suitability score;

obtain fourth utilization data associated with usage of the computing resources by the user workload running on the optimized compute resource;

use the fourth utilization data to determine a second suitability score indicating a measure of suitability of the optimized compute resource for running the user workload, the second suitability score being greater than or equal to the threshold; and provide the user account with an indication of the second suitability score.

4. The system of claim 1 wherein the computing resources comprise at least one of central processing unit (CPU) resource, a memory resource, a storage resource, a network availability resource, or a graphics processing unit (GPU) resource.

5. A method comprising:

obtaining utilization data indicating usage of computing resources by a workload running on a first virtual compute resource, the first virtual compute resource being allocated a first amount of a physical resource type of the computing resources;

inputting the utilization data into a model that is configured to identify optimized virtual compute resources that are allocated use of suitable amounts of computing resources for running workloads, the utilization data indicating a second amount of the physical resource type utilized by the workload;

receiving output data from the model indicating a measure of suitability for a second virtual compute resource to run the workload, the second virtual compute resource being allocated a third amount of the physical resource type;

determining, using the measure of suitability, that the second virtual compute resource is more suitable to run the workload than the first virtual compute resource based at least in part on the third amount of the physical resource type being more suitable to support the second amount utilized by the workload than the first amount of the physical resource type; and outputting a recommendation to a user account associated with the workload to migrate the workload from the first virtual compute resource to the second virtual compute resource.

6. The method of claim 5, wherein obtaining the utilization data comprises receiving, at a service provider network, the utilization data from a remote resource network that includes the computing resources, further comprising:

receiving, from the user account, a request to migrate the workload from the first virtual compute resource to the second virtual compute resource, wherein the second virtual compute resource is supported by additional computing resources included in the service provider network; and causing the workload to execute on the second virtual compute resource that is supported by the additional computing resources included in the service provider network.

7. The method of claim 5, wherein the computing resources are in a service provider network, further comprising:

receiving, via the user account, a request to migrate the workload from the first virtual compute resource running on the computing resources in the service provider network to the second virtual compute resource running on the computing resources in the service provider network; and causing the workload to execute on the second virtual compute resource.

8. The method of claim 5, wherein the utilization data comprises first utilization data, further comprising:

collecting second utilization data indicating usage of the computing resources by a set of workloads supported by a set of virtual compute resources; and training the model using at least a portion of the second utilization data to identify optimized virtual compute resources for workloads.

9. The method of claim 5, further comprising:

collecting second utilization data indicating usage of the computing resources by a set of workloads supported by a set of virtual compute resources;

using the second utilization data to determine a set of suitability scores indicating measures of suitability of individual ones of the set of virtual compute resources for running respective ones of the set of workloads;

identifying a subset of the set of suitability scores that are greater than or equal to a threshold, the subset of suitability scores corresponding to a subset of the set of workloads running on individual ones of a subset of the set of virtual compute resources;

identifying, from the second utilization data and using the subset of suitability scores, third utilization data indicating usage of the computing resources by the subset of workloads; and using at least the third utilization data to train the model to identify optimized virtual compute resources for workloads.

10. The method of claim 9, wherein training the model includes:

training a first layer of the model using the second utilization data; and training a second layer of the model using the third utilization data.

11. The method of claim 5, further comprising:

providing the user account with a first suitability score indicating a first measure of suitability of the first virtual compute resource for running the workload; and providing the user account with a second suitability score indicating a second measure of suitability of the second virtual compute resource for running the workload, wherein the second suitability score and the first suitability score indicate that the second virtual compute resource is more suitable to run the workload than the first virtual compute resource.

12. The method of claim 11, further comprising:

migrating the workload from the first virtual compute resource to run on the second virtual compute resource that is supported by the computing resources;

collecting additional utilization data indicating usage of the computing resources by the workload running on the second virtual compute resource;

determining an actual suitability score indicating an actual measure of suitability of the second virtual compute resource for running the workload; and providing the user account with the actual suitability score.

13. The method of claim 12, wherein:

the suitability score for the first virtual compute resource running the workload is different than an optimal score by more than a threshold; and the actual suitability score for the second virtual compute resource running the workload is within the threshold from the optimal score.

14. The method of claim 5, wherein the measure of suitability is a first measure of suitability, the method further comprising:
   determining a second measure of suitability for the first virtual compute resource running the workload;
   determining that the first measure of suitability and the second measure of suitability indicate that the second virtual compute resource is more suitable to run the workload than the first virtual compute resource; and
   generating the recommendation in response to the determining that the second virtual compute resource is more suitable to run the workload than the first virtual compute resource.

15. The method of claim 5, further comprising, subsequent to determining that the second virtual compute resource is more suitable to run the workload than the first virtual compute resource:
   launching the second virtual compute resource on additional computing resources included in the service provider network; and
   causing the workload to execute on the second virtual compute resource that is supported by the additional computing resources.

16. A system comprising:
   one or more processors; and
   one or more computer-readable media storing computer-executable instructions that, when executed by the one or more processors, cause the one or more processors to:
      collect first utilization data indicating usage of first physical computing resources by workloads running on virtual compute resources of a service provider network;
      use at least a portion of the first utilization data to train a model to receive input utilization data indicating physical resource consumption by a corresponding input workload and determine an output virtual compute resource that is allocated use of amounts of physical computing resources suitable for the physical resource consumption by the input workload;
      receive second utilization data indicating a first amount of second physical computing resources used by a particular workload running on a first virtual compute resource, the first virtual compute resource being allocated use of a second amount of the second physical computing resources;
      determine, using the model and the second utilization data, a measure of suitability for a second virtual compute resource to run the workload, the second virtual compute resource being allocated a third amount of physical computing resources;
      determine, using the measure of suitability, that the second virtual compute resource is more suitable to run the particular workload than the first virtual compute resource based at least in part on the third amount of the being more suitable to support the first amount utilized by the workload than the second amount allocated for use by the first virtual compute resource; and
      output a recommendation to a user account associated with the workload to migrate the particular workload from the first virtual compute resource to the second virtual compute resource.

17. The system of claim 16, wherein the first utilization data is associated with usage of the second computing resources in a remote resource network, comprising further computer-executable instructions that, when executed by the one or more processors, cause the one or more processors to:
   receive, from the user account, a request to migrate the workload from the first virtual compute resource to the second virtual compute resource, wherein the second virtual compute resource is supported by the first computing resources included in the service provider network; and
   cause the workload to execute on the second virtual compute resource that is supported by the first computing resources included in the service provider network.

18. The system of claim 16, comprising further computer-executable instructions that, when executed by the one or more processors, cause the one or more processors to:
   receive, via the user account, a request to migrate the workload from the first virtual compute resource to the second virtual compute resource running on the second computing resources; and
   cause the workload to execute on the second virtual compute resource.

19. The system of claim 16, comprising further computer-executable instructions that, when executed by the one or more processors, cause the one or more processors to:
   use the first utilization data to determine suitability scores indicating measures of suitability of individual ones of the virtual compute resources for running respective ones of the workloads;
   identify a group of the suitability scores that are greater than or equal to a threshold, the group of suitability scores corresponding to a group of the workloads running on individual ones of a group of the virtual compute resources;
   identify, from the first utilization data and using the group of the suitability scores, third utilization data indicating usage of the first computing resources by the group of the workloads; and
   use at least the third utilization data to train the model.

20. The system of claim 19, wherein using the at least a portion of the first utilization data to train a model includes:
   training a first layer of the model using the first utilization data; and
   training a second layer of the model using the third utilization data.

21. The system of claim 16, comprising further computer-executable instructions that, when executed by the one or more processors, cause the one or more processors to:
   provide the user account with a first suitability score indicating a first measure of suitability of the first virtual compute resource for running the particular workload; and
   provide the user account with a second suitability score indicating a second measure of suitability of the second virtual compute resource for running the particular workload, wherein the second suitability score and the first suitability score indicate that the second virtual compute resource is more suitable to run the particular workload than the first virtual compute resource.

22. The system of claim 21, comprising further computer-executable instructions that, when executed by the one or more processors, cause the one or more processors to:
   migrate the particular workload from the first virtual compute resource to run on the second virtual compute resource;

collect third utilization data indicating usage of the first computing resources by the particular workload running on the second virtual compute resource;
determine an actual suitability score indicating an actual measure of suitability of the second virtual compute resource for running the particular workload; and
provide the user account with the actual suitability score.

* * * * *